(12) United States Patent
Javidi et al.

(10) Patent No.: US 7,684,098 B2
(45) Date of Patent: Mar. 23, 2010

(54) OPTICAL SECURITY SYSTEM USING FOURIER PLANE ENCODING

(75) Inventors: Bahram Javidi, Storrs, CT (US); Ahouzi Esmail, Rabat (MA); Guansheng Zhang, Hamilton, VA (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 11/867,597

(22) Filed: Oct. 4, 2007

(65) Prior Publication Data

US 2008/0074745 A1    Mar. 27, 2008

Related U.S. Application Data

(62) Division of application No. 11/424,129, filed on Jun. 14, 2006, now Pat. No. 7,428,099, which is a division of application No. 09/493,692, filed on Jan. 28, 2000, now Pat. No. 7,095,540.

(60) Provisional application No. 60/117,872, filed on Jan. 29, 1999.

(51) Int. Cl.
*G03H 1/16* (2006.01)

(52) U.S. Cl. .............................. 359/29; 359/2; 359/561; 382/209

(58) Field of Classification Search ....................... None
See application file for complete search history.

(56) References Cited

U.S. PATENT DOCUMENTS 5,903,648 A * 5/1999 Javidi .......................... 380/54

OTHER PUBLICATIONS

B. Javidi, E. Ahouzi, 'Optical security system with Fourier plane encoding', Appl. Opt., vol. 37, No. 26, Sep. 10, 1998, pp. 6247-6255.*
B. Javidi, J. L. Horner, 'Optical pattern recognition for validation and security verification', Opt. Engr., vol. 33, No. 6, Jun. 1994, pp. 1752-1756.*

* cited by examiner

*Primary Examiner*—Arnel C Lavarias
(74) *Attorney, Agent, or Firm*—Cantor Colburn LLP

(57) ABSTRACT

A system for encrypting a set of data may include a signal source, and a first, second, third, and fourth subsystem. The first subsystem may receive a first signal from the signal source and provide as output therefrom a first output signal. The second subsystem may receive a second signal from the signal source and provide as output therefrom a second output signal. The third subsystem may combine the first and second output signals. The fourth subsystem may acquire a set of encrypted data.

6 Claims, 23 Drawing Sheets

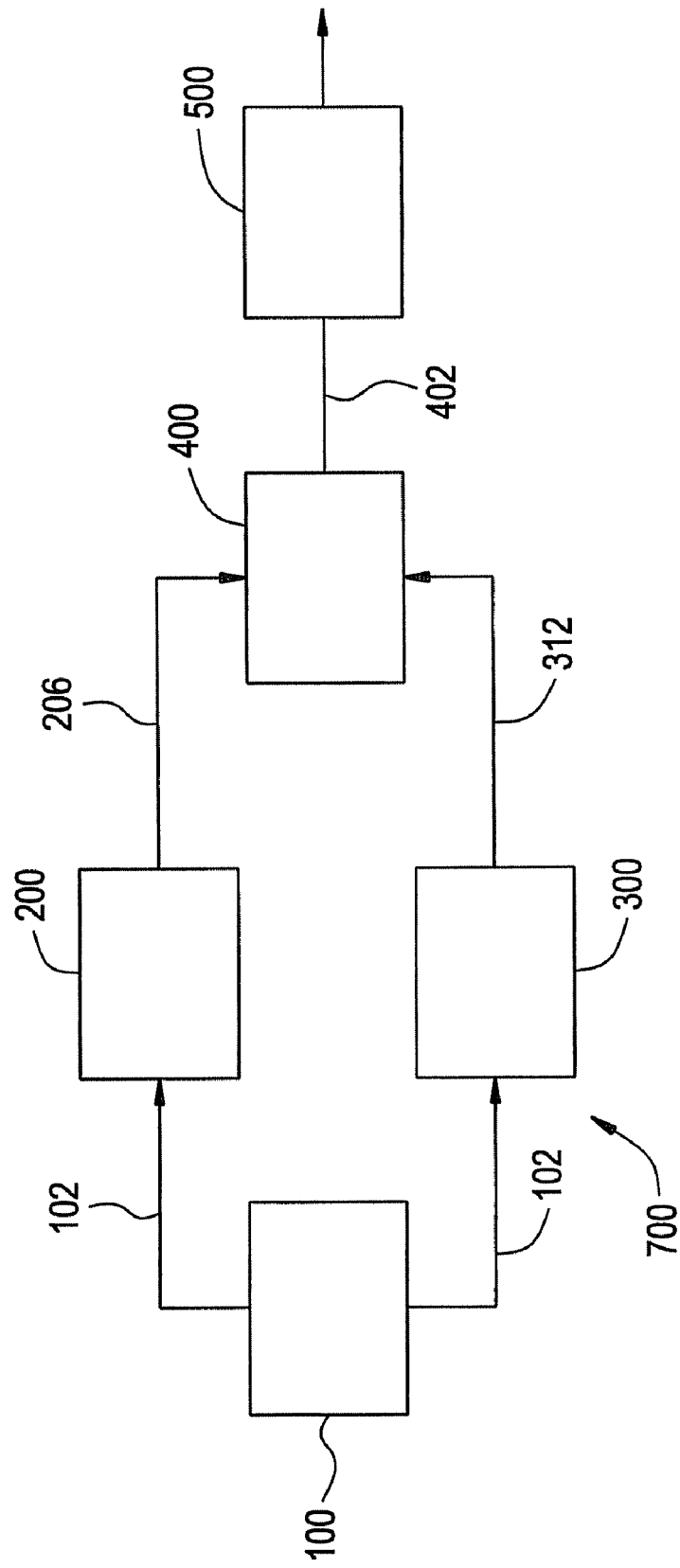

Unauthorized Fingerprint

Unauthorized Code

Unauthorized Fingerprint

Unauthorized Code

Unauthorized Fingerprint

Unauthorized Code

OPTICAL SECURITY SYSTEM USING FOURIER PLANE ENCODING

CROSS-REFERENCE TO RELATED APPLICATIONS

This is a divisional application of application Ser. No. 11/424,129, filed Jun. 14, 2006, priority to which is claimed herein and which is incorporated herein by reference. application Ser. No. 11/424,129 is a divisional application of application Ser. No. 09/493,692 filed Jan. 28, 2000, which claims the benefit of U.S. provisional application No. 60/117,872, filed Jan. 29, 1999, priority to both of which is claimed herein and both of which are incorporated herein by reference.

STATEMENT OF GOVERNMENTAL INTEREST

This application was supported by the USAF Rome Lab grant F19628-95-C-0136 and the National Science Foundation.

TECHNICAL FIELD

This invention relates to a system and method for verifying the authenticity of an object and securing a set of data.

BACKGROUND OF THE INVENTION

Due to the rapid advances in computers, CCD technology, image-processing hardware and software, printer, and copiers, there is an increase potential of fraud by reproducing the patterns and pictures used to verify the authenticity of the objects. The application of optical processing and pattern recognition for security verification of credit cards, passports and other forms of biometric image identification have been proposed (B. Javidi and J. L. Horner, "Optical Pattern Recognition for Validation and Security Verification," Opt. Eng., 33(6), 1752-1756 (1994); H.-Y. Li, Y. Qiao, and D. Psaltis, "Optical Network for Real-time Face Recognition", Appl. Opt. 32, 5026-5035 (1993); T. Grycewicz, and B. Javidi, "Experimental Comparison of Binary Joint Transform Correlators Used for Fingerprint Identification," Opt. Eng., 35(9), 2519-2525 (1996); P. K. H. Fielding, J. L. Horner and C. K. Makekau, "Optical Fingerprint Identification by Binary Joint Transform Correlation," Opt. Eng., 30(12), 1958-1961 (1991); C. L. Wilson, C. I. Watson, E. G. Pack, "Combined Optical and Neural Network Fingerprint Matching" in Optical Patteern Recognition VIII, D. P. Casasent and T. Chao, ed., Proc. Soc. Photo-Opt. Instrum. Eng. 373-383 (1997); J. Rodolfo, H. Rajbenbach and J-P. Huignard, "Performance of a Photorefractive Joint Transform Correlator for Fingerprint Identification," Opt. Eng., 34(4), 1166-1171 (1995); Refregier and B. Javidi, "Optical Image Encryption using Input and Fourier Plane Random Phase Encoding," Opt. Lett., 20, 767-769, (1995); M. Kowalczyk, "Spectral and Imaging Properties of Uniform Diffusers", JOSA A, Vol. 1, No. 2, 192-200, February 1984.; H. Kogelnik and K. S. Pennington, "Holographic Imaging Through a Random Medium", Optical Society of America., 58, 2, 273-274, (1968) which are incorporated herein by reference).

Various kinds of optical data processing technology for information security have been proposed. (H.-Y. S. Li, Y. Qiao, and D. Psaltis, Appl. Opt. 32, 5026 (1993); B. Javidi and J. L. Horner, Opt. Eng. 33, 1752 (1994); P. Refregier and B. Javidi, Opt. Lett. 20, 767 (1995); F. Goudail, F. Bollaro, B. Javidi, and P. Refregier, J. Opt. Soc. Am. A15, 2629 (1998); C. L. Wilson, C. I. Watson, and E. G. Paek, Proc. SPIE 3078, 373 (1997); D. Weber and J. Trolinger, Opt. Eng. 38, 62 (1999); O. Matoba and B. Javidi, Opt. Lett. 24, 762 (1999), all of which are incorporated herein by reference). In one approach (P. Refregier and B. Javidi, Opt. Lett. 20, 767 (1995), which is incorporated herein by reference), the data are encrypted optically by double-random phase encoding with uniformly distributed random phase keys in both the input and Fourier planes. In addition, digital holographic techniques (U. Schnars and W. Juptner, Appl. Opt. 33, 179 (1994); B. W. Schilling, et al, Opt. Lett. 22, 1506 (1997); E. Cuche, F. Bevilacqus, and C. Depeursinge, Opt. Lett. 24, 291 (1999), which are incorporated herein by reference) that use a CCD camera for direct recording of a hologram have become available owing to the development of the imaging technology.

The following references are incorporated herein by reference in their entirety: R. O. Duda, P. E. Hart, Pattern Classification and Scene Analysis, J. Wiley and Sons, 1973; R. Schalkoff, Pattern Recognition Statistical, Structural and Neural Approaches, J. Wiley and Sons 1992; P. Hariharan, Optical Holography Principles Techniques and Approaches, Cambridge University Press 1984; W. H. Lee, Computer Generated Holography, Techniques and Applications, Progress in Optics, Vol 16, Ed., E. Wolf, Amsterdam North Holland 1978; J. W. Goodman, Introduction to Fourier Optics, McGraw-Hill 1996.

SUMMARY OF THE INVENTION

In this invention a new method for optical security verification based upon phase encoded convolution of a primary image with a random phase code is proposed. The convolution of the primary image and the random code yields position-invariance to a possible shift of the primary image or the random code. In this method, a nonlinear joint transform correlator (JTC) verifies biometric information and the random code simultaneously to determine whether or not an object, such as an ID card, is authentic and thus whether the object is being used by an authorized person. The binarization of the phase information encoded on the input card is disclosed. A composite reference image, obtained from a set of rotated primary images and convolved with the random code, in order to obtain position and rotation-invariance, is used. The system tolerates rotational variations of the input images. The performance of the proposed method is investigated using a number of metrics. An optoelectronic architecture is proposed to perform the verification. The discrimination capability of the proposed method against unauthorized codes or unauthorized primary images is investigated in the presence of additive noise and distortions. The robustness of the proposed method in the presence of noise and distortions such as missing data is addressed.

The proposed method for security is based upon convolution of the primary image by a random code. The primary image f(x,y) is phase encoded, which can be mathematically represented by, $\exp[i\pi f(x,y)/\text{Max}(f(x,y))]$. The range of variation of the phase encoding is $[0, \pi]$. The phase-encoded primary image is convolved with a random code c(x,y). In this invention the random code c(x,y) is chosen to be the Fourier transform (FT) of a phase only uniform random distribution (M. Kowalczyk, "Spectral and Imaging Properties of Uniform Diffusers", JOSA A, Vol. 1, No. 2, 192-200, February 1984, which is incorporated herein by reference). With this choice of c(x,y) the invention is assured of having high light efficiency output. The resulting convolved image is a complex amplitude distribution:

$$r(x,y) = \exp[i\pi f(x,y)/\text{Max}(f(x,y))] \otimes c(x,y), \quad (1)$$

where $\otimes$ denotes convolution.

The convolved image r(x,y), will be placed on a card or the object to be verified. It will serve as the reference image to the optical processor. Therefore, the information encoded on the card is a combination of primary information f(x,y) and a machine code c(x,y). For additional security, the convolved pattern r(x,y), placed on the ID card or any personal document, can be made to be phase-only information by setting the amplitude of the complex distribution r(x,y) equal to one (S. Maze and Ph. Refregier, "Optical Correlation: Influence of the Coding of the Input Image" *Appl. Opt.* 33, 6788-6796 (1994); S. Maze and Ph. Refregier, "Noise Robustness of Optical Correlation for Amplitude or Phase Modulation of the Input Image", *Opt. Lett.*, 17, 426-428, (1992) which are incorporated herein by reference). The phase only pattern reference image on the ID card or on the personal document is given by $$\bar{r}(x, y) = \frac{r(x, y)}{|r(x, y)|}. \quad (2)$$

This invention also investigates the performance of binarization of the phase information of the reference encoded on the document. The binarization of the reference image is given by:

$$\bar{r}_B(x, y) = \begin{cases} -1 & \text{if } Re[r(x, y)] < 0, \\ 1 & \text{if } Re[r(x, y)] \geq 0 \end{cases} \quad (3)$$

where Re[r(x,y)] is the real part of r(x,y).

A joint transform correlator (JTC) architecture (C. J. Weaver and J. W. Goodman, "A Technique for Optically Convolving Two Functions" *Appl. Opt.* 5, 1248-1249 (1966) which is incorporated herein by reference) is used to verify the authenticity of the card. A nonlinear JTC is more practical because of the limited dynamic range of optical devices. In addition, the nonlinear JTC offers many advantages in terms of correlation performance (B. Javidi, "Nonlinear Joint Transform Correlators," in *Real-Time Optical Information Processing*, B Javidi and J. L. Horner, Eds., Academic Press, New York, (1994); B. Javidi, "Nonlinear Joint Power Spectrum Based Optical Correlation," *Appl. Opt.* 28, 2358-2367 (1989) which are incorporated herein by reference). A nonlinear joint transform correlator is used to perform the correlation between the convolution of the phase encoded primary pattern and the random code mask and the phase distribution, recorded on the card given by Equation 2. In the Fourier plane of the nonlinear join t transform correlator, a threshold function, $V_T(\alpha, \beta)$ (FIG. 2), is used which is the sum of the self-product terms of the joint power spectrum. A k-th-power-law nonlinearity ($0 \leq k \leq 1$) is applied to the modified joint power spectrum in the Fourier plane (B. Javidi, "Nonlinear Joint Transform Correlators," in *Real-Time Optical Information Processing*, B Javidi and J. L. Horner, Eds., Academic Press, New York, (1994); B. Javidi, "Nonlinear Joint Power Spectrum Based Optical Correlation," *Appl. Opt.* 28, 2358-2367 (1989) which are incorporated herein by reference). An inverse Fourier transform of the nonlinearly transformed joint power spectrum will generate the nonlinear joint transform correlator output plane. If s(x,y) is the signal to be verified, the nonlinear joint transform correlator output of the system is given by $$\text{Output}(x,y) = s(x,y) *^k \bar{r}(x,y) \quad (4)$$

where the superscript (*k) denotes the k-th law nonlinear joint transform correlation, and k∈[0,1] is the severity of the nonlinearity used in the Fourier plane(B. Javidi, "Nonlinear joint transform correlators," in *Real-Time Optical Information Processing*, B Javidi and J. L. Horner, Eds., Academic Press, New York, (1994); B. Javidi, "Nonlinear Joint Power Spectrum Based Optical Correlation," *Appl. Opt.* 28, 2358-2367 (1989) which are incorporated herein by reference). The k-th law nonlinear JTC in the Fourier plane is defined by: $|RS|^k \exp[j\phi_s - j\phi_R]$, where $|R|\exp[j\phi_R]$ and $|S|\exp[j\phi_s]$ are the Fourier transforms of the reference image and the input image, respectively. When the phase of the reference input is binarized, the k-th law nonlinear joint transform correlator output is define as $$\text{Output}(x,y) = s(x,y) *^k \bar{r}_B(x,y) \quad (5)$$

A security method and system that combines double-random phase encryption with a digital holographic technique is disclosed. The proposed system allows for the digital storage, transmittal, and decryption of the encrypted data. One benefit of the proposed system compared with electronic encryption techniques is that optical processing provides many degrees of freedom for securing information. Another benefit is that optical encryption is naturally suited to encrypting information, e.g., real images and information stored in holographic media, that exists in the optical domain. Either optical or computer decryption techniques can be used with the proposed system, depending on the specific application. Computer decryption is less secure because the phase key is stored electronically, but no manual focusing adjustment is required and the decryption system is more compact.

Let f(x,y), a(x,y), and H(ξ,η) denote an image to be encrypted, an input random phase mask, and a Fourier random phase mask, respectively. The input random phase mask, a(x,y), is bonded with the image f(x,y). The resultant product of the two images is Fourier transformed and is multiplied by the Fourier phase mask H (ξ,η). A second Fourier transform produces the encrypted data. The encrypted data is recorded as a Fourier hologram, using an interference with the reference wave R(ξ,η). The hologram $I_E(\xi,\eta)$ can be written as $$I_E(\xi,\eta) = |[F(\xi,\eta) \otimes A(\xi,\eta)]H(\xi,\eta)|^2 + |R(\xi,\eta)|^2 + \{[F(\xi,\eta) \otimes A(\xi,\eta)]H(\xi,\eta)\}R(\xi,\eta)^* + \{[F(\xi,\eta) \otimes A(\xi,\eta)]H(\xi,\eta)\}^*R(\xi,\eta) \quad (6)$$

where F (ξ,η) and A (ξ,η) denote Fourier transforms of f(x,y) and a(x,y), respectively, and θ denotes a convolution operation. Inasmuch the first and second terms on the right-hand side of Eq. (6) can be known a priori by obtaining the power spectrum of the encrypted data and reference beam, the following holographic data, $I_E = (\xi,\eta)$, can be obtained:

$$I_E = \{[F(\xi,\eta) \otimes A(\xi,\eta)]H(\xi,\eta)\}R(\xi,\eta)^* + \{[F(\xi,\eta) \otimes A(\xi,\eta)]H(\xi,\eta)\}^*R(\xi,\eta). \quad (7)$$

Similarly, the holographic data of the Fourier phase mask, $I_{MN}$ (ξ,η), can also be obtained and is given by $$I_M(\xi,\eta) = H(\xi,\eta)R(\xi,\eta)^* + H(\xi,\eta)^*R(\xi,\eta). \quad (8)$$

When the reference beam is a slightly inclined planar wave, the first term on the right-hand side of Eq. (7) and the second term on the right-hand side of Eq. (8) can be extracted by Fourier transforming the holographic data to obtain the encrypted data and the Fourier phase mask, respectively. By multiplying the extracted encrypted data and the Fourier phase mask followed by inverse Fourier transformation, the decrypted data, d(x,y), can be obtained as $$d(x,y) = FT^{-1}[(\{[F(\xi,\eta) \otimes A(\xi,\eta)]H(\xi,\eta)\}R(\xi,\eta)^*) \times [H(\xi,\eta)^*R(\xi,\eta)]] = FT^{-1}[F(\xi,\eta) \otimes A(\xi,\eta)] = f(x,y)a(x,y), \quad (9)$$

where $FT^1$ [ ] denotes the inverse Fourier transform operation and $*H(\xi,\eta)*^2$ is equal to a constant because the phase mask has only phase value. The intensity of Eq. (9) produces the original image because f(x,y) is a positive real-valued function and a(x,y) is phase only.

A system and method of verifying the authenticity of an object is presented. The method comprises providing a primary image; providing a secondary image; encoding the primary image; providing a random code; convolving the encoded primary image with the random code, providing thereby a reference image; affixing the reference image to the object to be authenticated; transforming the reference image; and comparing the transformed reference image with the secondary image. The system comprises a signal source; a first subsystem receiving a first signal from the signal source and providing as output therefrom a first output signal; a second subsystem receiving a second signal from the signal source and providing as output therefrom a second output signal; a third subsystem receiving the first and second output signals for comparing the first output signal with the second output signal.

DESCRIPTION OF THE DRAWINGS

FIG. 1 is a schematic representation of a system for security verification of an object.

DESCRIPTION OF THE PREFERRED EMBODIMENTS

Figure 1A:
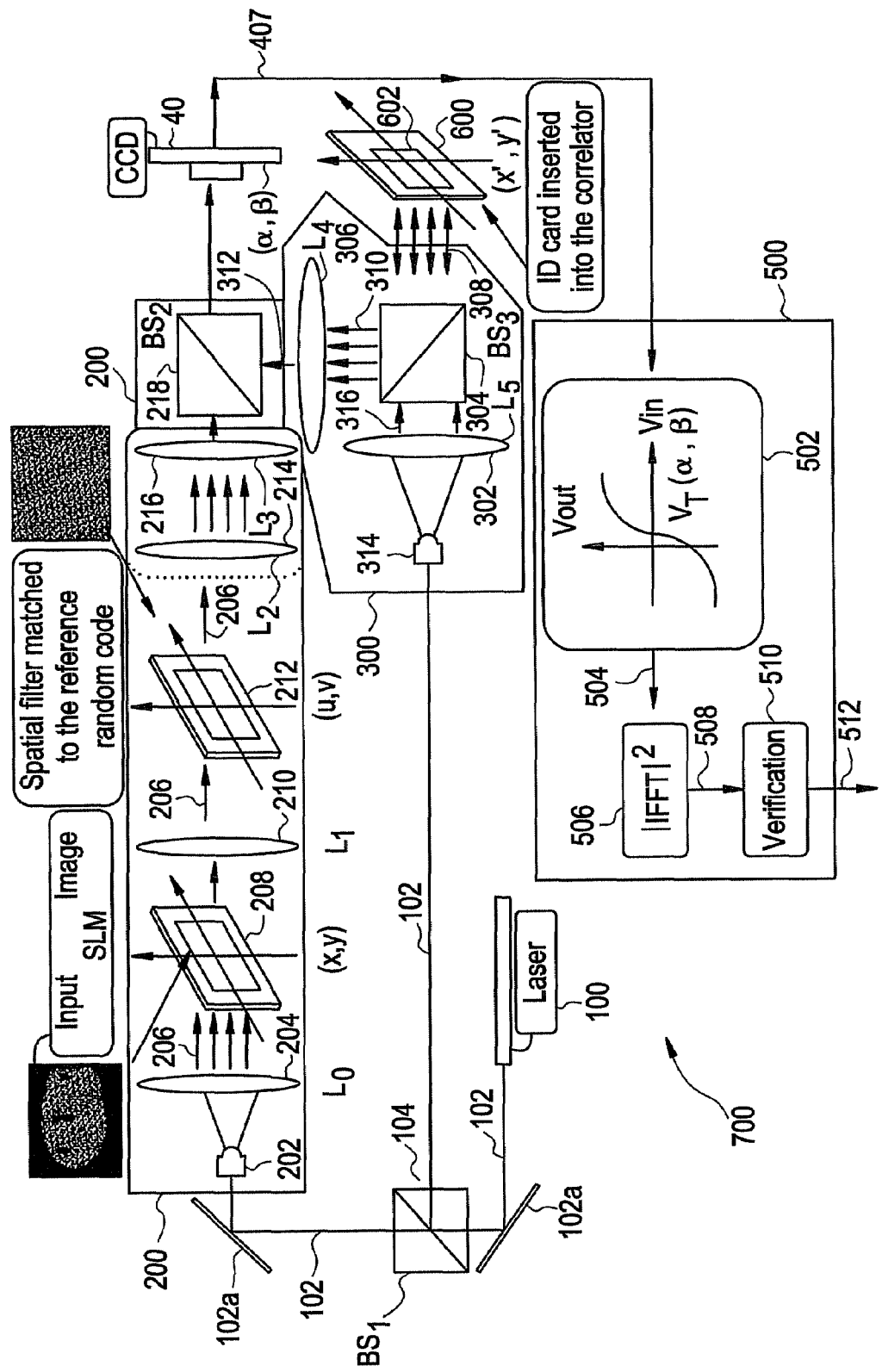
FIG. 1A is a schematic representation of an optical setup for security verification of an object based upon a nonlinear joint transform correlator.

In FIG. 1 a schematic representation of a system for security verification is shown generally at 700. In particular in FIG. 1 a source of coherent light 100 is provided to illuminate 102 first and second Fourier transform optical subsystems 200, 300, by way of mirrors 102a and beam splitter 104. The first Fourier transform optical subsystem 200 provides as output therefrom a first optical output signal 206 indicative of the Fourier transform of the convolution of the random code, $c(x,y)$, and the phase encoded primary image, $\exp\{i\pi f(x,y)/\text{Max}[f(x,y)]\}$. The second Fourier transform optical subsystem 300 provides as output therefrom a second optical output signal 312 indicative of the Fourier transform of the a phase only convolved image, $(x=,y=)$. The first and second optical output signals 206, 312 are detected at a detector 400. A signal 402 indicative of the joint power spectrum of the first and second optical signals 206, 312 is provided as output from the detector 400 to a verification subsystem 500 for correlation thereof.

The optical setup for security verification 700 is shown in FIG. 1A as a nonlinear joint transform correlator (JTC) 700. The optical system 700 consists of two arms. In one arm, the convolution of a secondary image such as the phase encoded primary pattern $\exp\{i\pi f(x,y)/\text{Max}[f(x,y)]\}$ and the random code, $c(x,y)$, is performed by use of a spatial filter matched to the random code $c(x,y)$, and positioned in the Fourier, or $(u,v)$ plane. Light 102 is projected by beam expander 202 and collimating lens 204 at a spatial light modulator (SLM) 208. The phase-encoded primary pattern is displayed by means of the spatial light modulator (SLM) 208. Fourier transform lens $L_1$ 210, images the Fourier transform (FT) of the phase-encoded primary pattern, $F(u,v)$, in the Fourier, or $(u,v)$, plane. The processor 700 has an a-priori knowledge of the random code mask $c(x,y)$. Thus, in the $(u,v)$-plane, a filter 212 with transmission $C(u,v)$ is placed. $C(u,v)$ is the Fourier transform of the random code $c(x,y)$. Lenses $L_2$ and $L_3$ (214, 216), image the complex amplitude distribution, formed at the filter plane, onto the $(\alpha,\beta)$-plane, where a detector 400 is placed. Thus the Fourier transform of the convolution between the two functions $\exp i\pi f(x,y) \otimes \text{Max } f(x,y)$ and $c(x,y)$ is obtained in $(\alpha,\beta)$-plane. In the other arm, an object, whose authenticity is to be verified and including a reference image such as the phase only distribution, $(x=,y=)$, is placed in the input plane $(x=,y=)$ of the processor 700. Light 102 is projected by beam expander 314 and collimating lens 302 at 316 to a beam splitter 304. Coherent light 308 from the beam splitter 304 illuminates the reference image 602 from a card 600. Lens $L_4$ 306 images (at 310) the Fourier transform of $(x=,y=)$ onto the $(\alpha,\beta)$-plane of the detector 400. Thus, a joint power spectrum is obtained in $(\alpha,\beta)$-plane. The joint transform interference intensity is recorded by the detector 400 and is nonlinearly transformed by a nonlinear threshold function generator 502 in the verification subsystem 500. The resulting modified joint transform spectrum 504 is inverse Fourier transformed 506 and the modulus thereof squared to obtain the correlation at 508 of the primary image and the reference image. The correlation signal 512 may be obtained at 510 either by performing optical Fourier transform by displaying the modified intensity distribution written on the SLM, or by using discrete Fourier transform.

It will be appreciated to one skilled in the art that the aforedescribed system 700 for verifying the authenticity of an object is not limited to an optical system but also encompasses electronic systems as well as combinations thereof. It will also be appreciated that the signals generated therein may be either one dimensional or two dimensional or n dimensional.

Computer simulations have been conducted to investigate the performance of the proposed optical systems.

In the simulations, a discrimination capability of the security system against an unauthorized input card is examined. The card is considered to be unauthorized, when either the input primary biometric image or the random code is unauthorized. To evaluate the discrimination, we define the discrimination ratio (DR) as $$DR = \frac{|\max[AC(x, y)]|^2}{|\max[CC(x, y)]|^2}, \quad (10)$$

where max[AC(x,y)] is the auto-correlation peak value, and max[CC(x,y)] is the maximum value of the cross-correlation output. The auto-correlation is defined as $$AC(x, y) = [\exp[i\pi f(x, y)/\text{Max}(f(x, y))] \otimes c(x, y)]^{*k} \times \quad (11)$$
$$\left( \frac{\exp[i\pi f(x, y)/\text{Max}(f(x, y))] \otimes c(x, y)}{|\exp[i\pi f(x, y)/\text{Max}(f(x, y))] \otimes c(x, y)|} \right)$$

where f(x,y) is the authorized primary pattern and c(x,y) is the authorized code as defined above. The cross-correlation is defined as $$CC(x, y) = [\exp[i\pi g(x, y)/\text{Max}(g(x, y))] \otimes a(x, y)]^{*k} \times \quad (12)$$
$$\left( \frac{\exp[i\pi f(x, y)/\text{Max}(f(x, y))] \otimes c(x, y)}{|\exp[i\pi f(x, y)/\text{Max}(f(x, y))] \otimes c(x, y)|} \right)$$

where g(x,y) is an unauthorized primary pattern and a(x,y) is an unauthorized code. The higher the DR, the better the discrimination of the system is against unauthorized inputs.

In addition, the robustness of the proposed optical security system in the presence of additive input noise is investigated. In the noise performance tests of the system, both white and colored noise are considered. The performance of the proposed method is investigated using a number of metrics. The signal to noise ratio, SNR, is defined as the ratio of the expected value squared of the correlation peak amplitude to the variance of the correlation peak amplitude. And the peak-to-output energy ratio metric, POE, is defined as the ratio of the expected value squared of the correlation peak to the average expected value of the output signal energy.

Figure 2A:
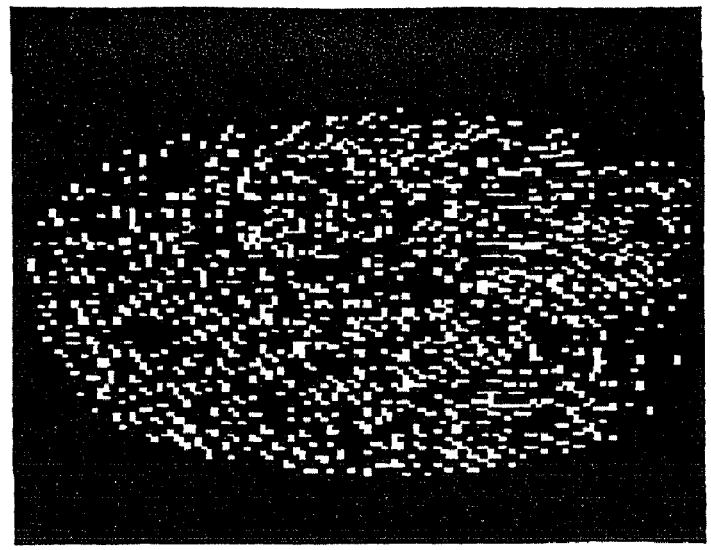
FIG. 2A is an authorized fingerprint used in the authorization.
Figure 2B:
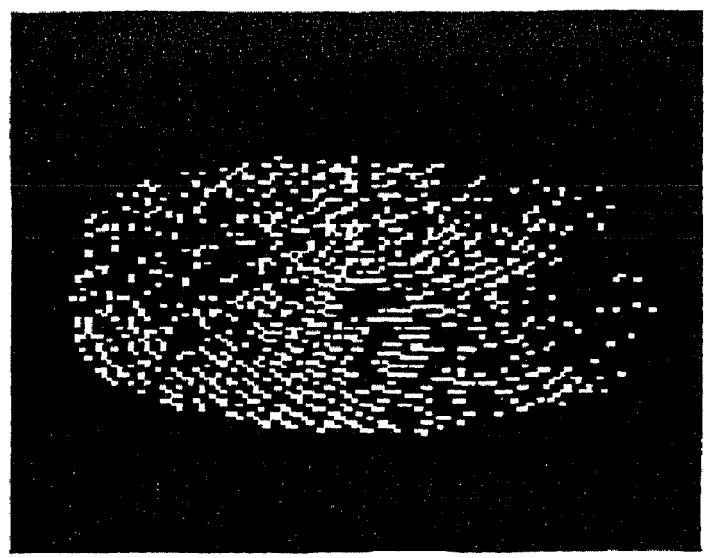
FIG. 2B is an unauthorized fingerprint used in the authorization.
Figure 3A:
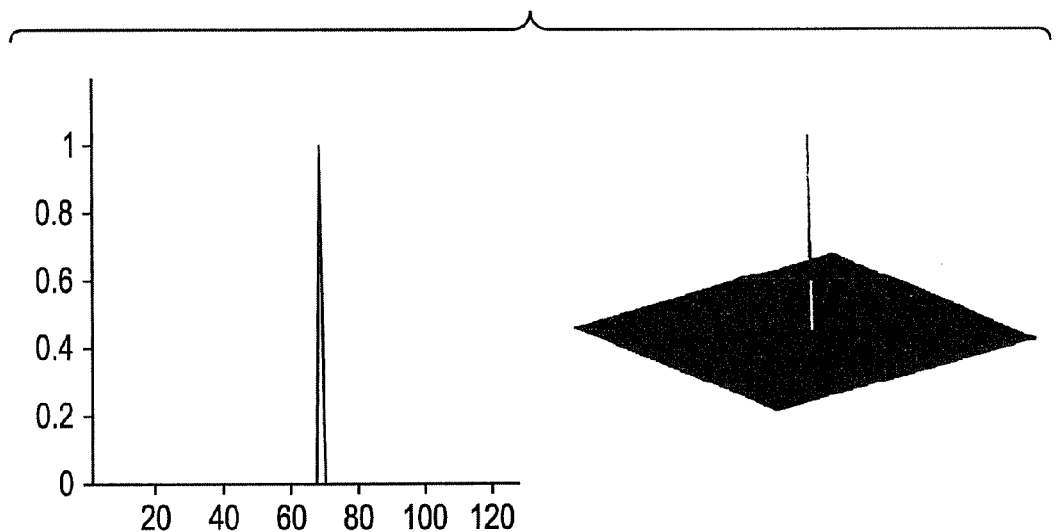
FIG. 3A is the output correlation intensity of the nonlinear joint transform correlator for an authentic input with nonlinearity k=0.3
Figure 3B:
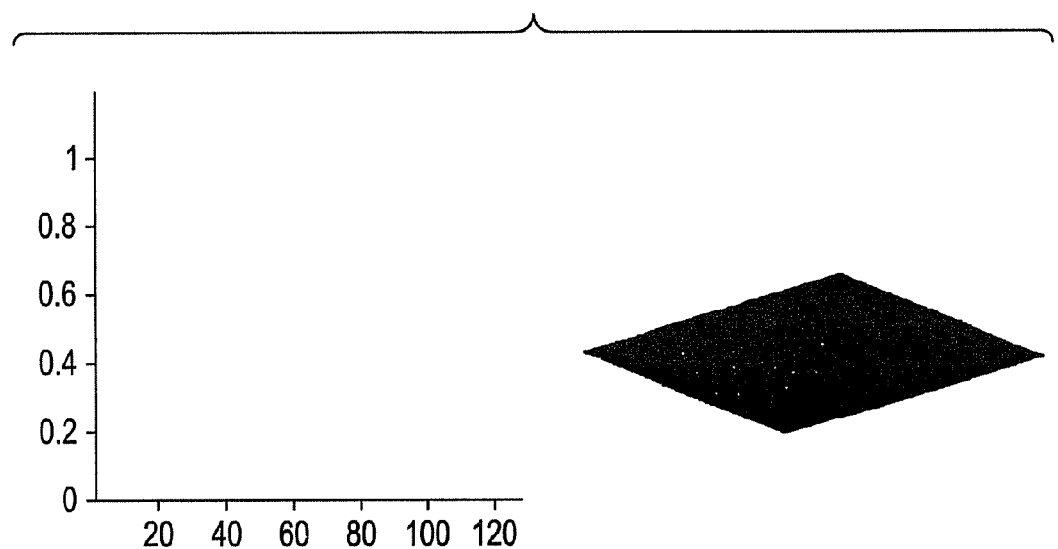
FIG. 3B is the output of the nonlinear joint transform correlator for an authorized input with an unauthorized code with nonlinearity k=0.3.
Figure 3C:
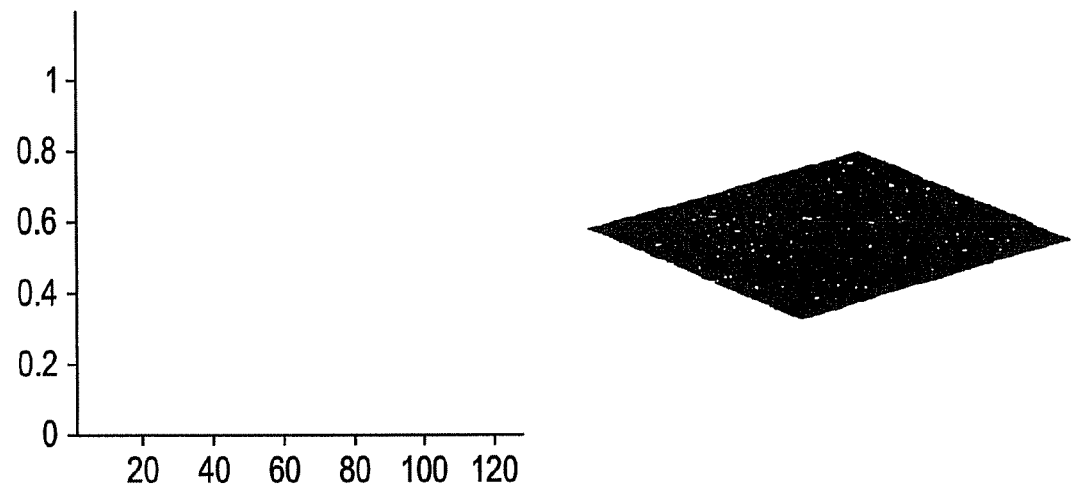
FIG. 3C is the output of the nonlinear joint transform correlator for an unauthorized input with an authorized code with nonlinearity k=0.3.
Figure 3D:
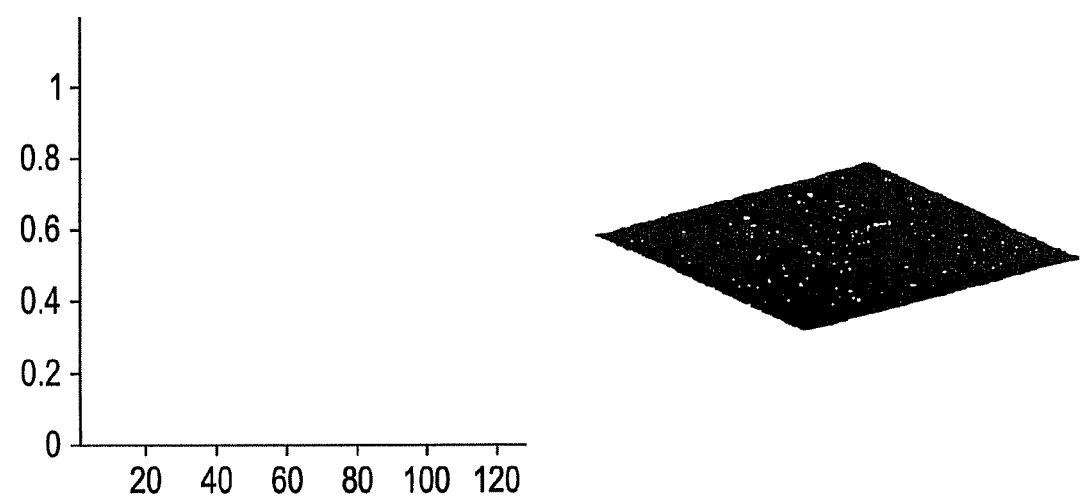
FIG. 3D is the output of the nonlinear joint transform correlator for an unauthorized input and an unauthorized code with nonlinearity k=0.3.

Throughout the simulations, fingerprint biometrics are used as the primary image; however the other biometrics can be used as well. The optical processor 700 was first tested for authenticity of a card encoded with a fingerprint information convolved with a random code in the absence of input noise and distortions. Two fingerprints are selected for computer simulation as shown in FIGS. 2A and 2B. The fingerprint in FIG. 2A is chosen as authentic and the fingerprint in FIG. 2B is considered as an unauthorized biometric image to be rejected. FIG. 3A is the output correlation intensity for the authentic card, when the authorized fingerprint and code are used. A sharp and strong output peak for the authentic card is obtained. The simulations in FIGS. 3A-D were performed with nonlinearity index of k=0.3 for the correlator. In the experiments, the correlation output are normalized by the maximum correlation peak obtained by the authentic card. FIGS. 3B, 3C and 3D show the output correlation intensity for the false-class input for which low level cross-correlations appear. FIG. 3B shows the output correlations for an authorized fingerprint and an unauthorized random code. FIG. 3C shows the correlation outputs for the authorized random code and an unauthorized fingerprint. FIG. 3D shows the output correlation planes for an unauthorized fingerprint and an unauthorized code.

The correlation output of the proposed processor is investigated in the presence of input noise or other distortions such as missing data in order to study the robustness of the system. To test the noise tolerance of this method, different kinds of additive noise are considered. The reference to be verified may contain some surface noise, due to continuous use. Also, during the real time registration of the primary pattern for verification, the detector may introduce some noise which is considered in the simulations. The output of the nonlinear joint transform correlator in the presence of additive noise can be written as:

$$\text{Output}(x, y) = \quad (13)$$
$$\{\exp[i\pi(f(x, y) + n_p(x, y))/\text{Max}(f(x, y) + n_p(x, y))] \otimes c(x, y)\}^{*k} \times$$
$$\left\{ \frac{\exp[i\pi(f(x, y))/\text{Max}(f(x, y))] \otimes c(x, y)}{|\exp[i\pi(f(x, y))/\text{Max}(f(x, y))] \otimes c(x, y)|} \right\},$$

where $n_p$ (x,y) and $n_c$ (x,y) are the additive noise present on the primary image and, the card, respectively.

Simulation results are presented to illustrate the robustness of the system against additive noise using a k-th law nonlinear JTC. The signal to noise ratio (SNR), discrimination ratio (DR), and peak-to-output energy ratio (POE) are measured. The simulation of the input noise on the input card and on the reference image has been carried out for several values of standard deviation. The performance parameters are computed for 50 different sample realizations of the input signals corrupted by noise.

Figure 4A:
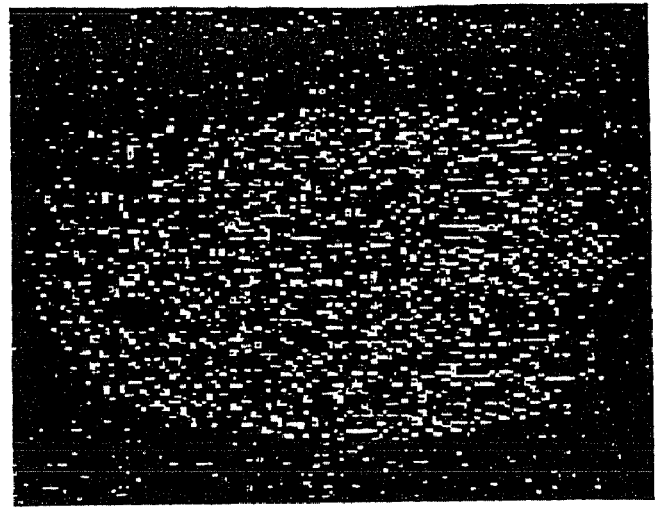
FIG. 4A is the fingerprint of FIG. 2 as the input primary image corrupted by additive white noise with a mean of zero and a standard deviation of 0.3.

The experiments were conducted with both additive white noise and colored noise. In the simulations, a range of values for the nonlinearity index k of the correlator has been tested. The input biometrics were corrupted by Gaussian noise, with a standard deviation equal to 0.1, 0.2 and 0.3. FIG. 4A shows the noisy image with white noise of standard deviation 0.3. In the simulations, the reference encoded on the card is also corrupted by a zero mean additive white noise with a standard deviation equal to 0.3, 0.5 and 0.7. The noise robustness variation results obtained are similar for all three levels of noise that corrupt the information encoded on the card. The results obtained with a noise level standard deviation equal to 0.7 are presented. The experiment was performed by simulating 50 realizations of white noise.

Figure 5A:
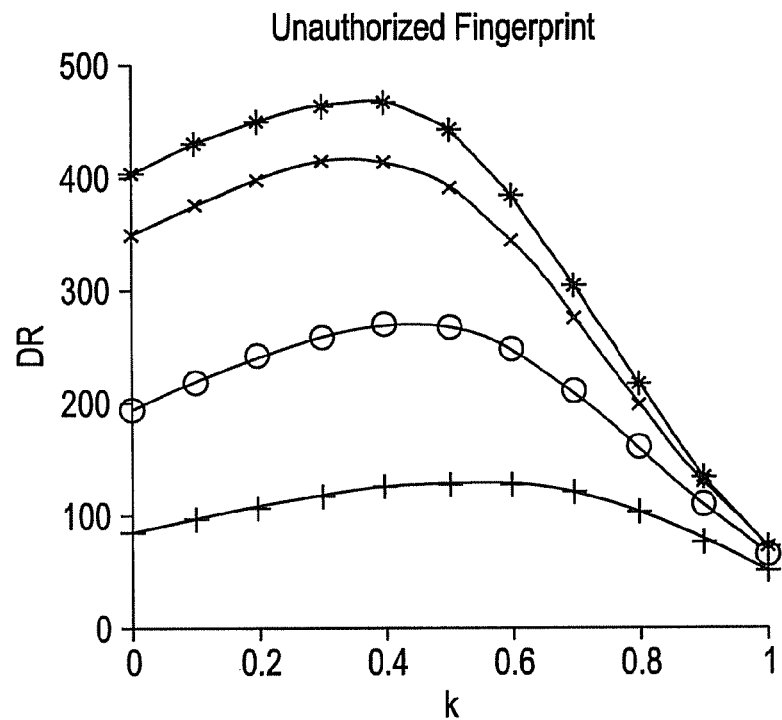
FIG. 5A is the simulation results of the average of the discrimination ratio(DR) between an authorized card and an unauthorized card with an unauthorized fingerprint in the presence of additive white noise versus the nonlinearity index k. The results correspond to white noise on the reference image with a standard deviation of 0.7 and different input additive noise levels. The curves designated by an asterisk (*) correspond to the performance of the system in the absence of input noise.
Figure 5B:
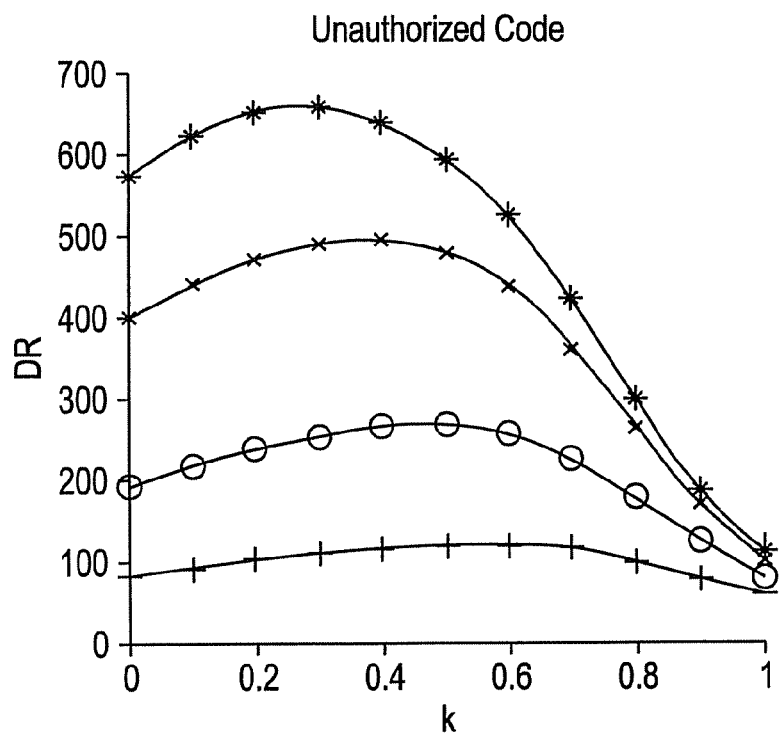
FIG. 5B is the simulation results of the average of the discrimination ratio (DR) between an authorized card and an unauthorized card with an unauthorized code in the presence of additive white noise versus the nonlinearity index k. The results correspond to white noise on the reference image with a standard deviation of 0.7 and different input additive noise levels. The curves designated by an asterisk (*) correspond to the performance of the system in the absence of input noise.

FIGS. 5A and 5B show the variation of the discrimination ratio (DR) versus the nonlinearity index k of the correlator, when the primary pattern is corrupted by additive Gaussian white noise with different standard deviations. FIG. 5A corresponds to the discrimination against unauthorized input card with an authentic code and an unauthorized fingerprint. FIG. 5B corresponds to the discrimination against unauthorized input card encoded with an unauthorized code and an authentic fingerprint.

Figures 5C, 5D:
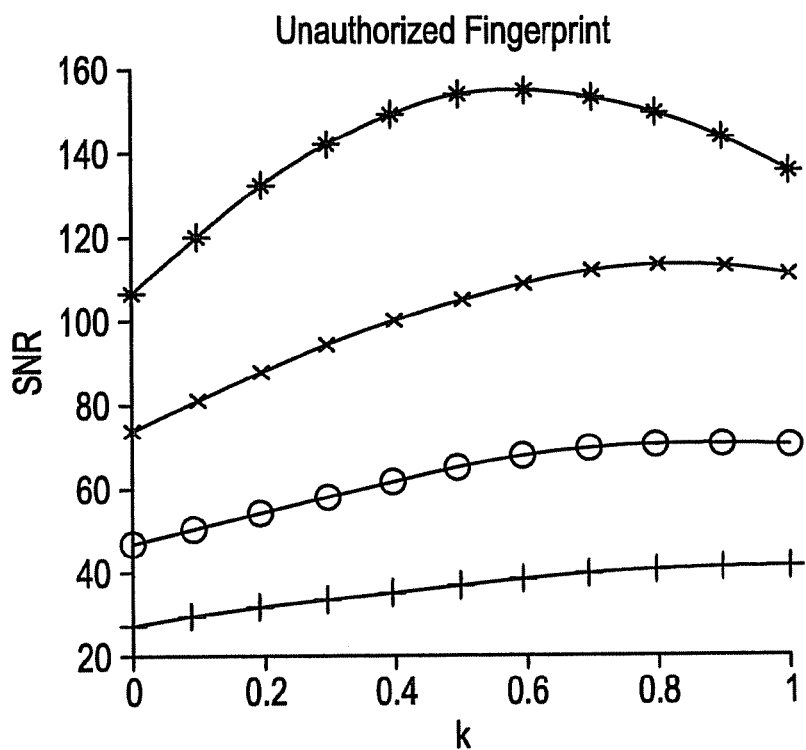
FIG. 5C is the simulation results of the output Signal-To-Noise ratio (SNR) in the presence of additive white noise versus the nonlinearity index k. The results correspond to white noise on the reference image with a standard deviation of 0.7 and different input additive noise levels. The curves designated by an asterisk (*) correspond to the performance of the system in the absence of input noise.
FIG. 5D is the simulation results of the output Peak-to-Output Energy ratio (POE) in the presence of additive white noise versus the nonlinearity index k. The results correspond to white noise on the reference image with a standard deviation of 0.7 and different input additive noise levels. The curves designated by an asterisk (*) correspond to the performance of the system in the absence of input noise.

FIGS. 5C and 5D illustrate the SNR and the POE respectively as a function of the nonlinearity k when the primary pattern is corrupted by additive Gaussian white noise with different standard deviations.

Figure 4B:
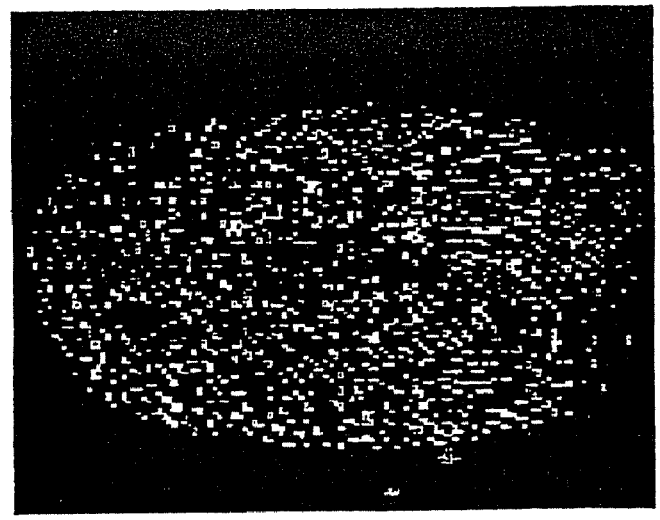
FIG. 4B is the fingerprint of FIG. 2A as the input primary image corrupted by additive colored noise with a mean of zero and a standard deviation of 0.3 and a bandwidth of 15.

The experiments were repeated with the biometrics images that were corrupted by zero mean additive colored noise of bandwidth equal to 15, and various standard deviations. FIG. 4B shows the corrupted image with additive colored noise with a standard deviation equal to 0.3 and bandwidth of 15. In the simulations, the encoded reference on the card is also corrupted by a zero mean additive color noise with bandwidth of 15 and a standard deviation equal to 0.3, 0.5 and 0.7. The results obtained for the reference corrupted with an additive colored noise with a standard deviation equal to 0.7 are presented. The experiment was done over the results of 50 realizations of independent noise.

Figure 6A:
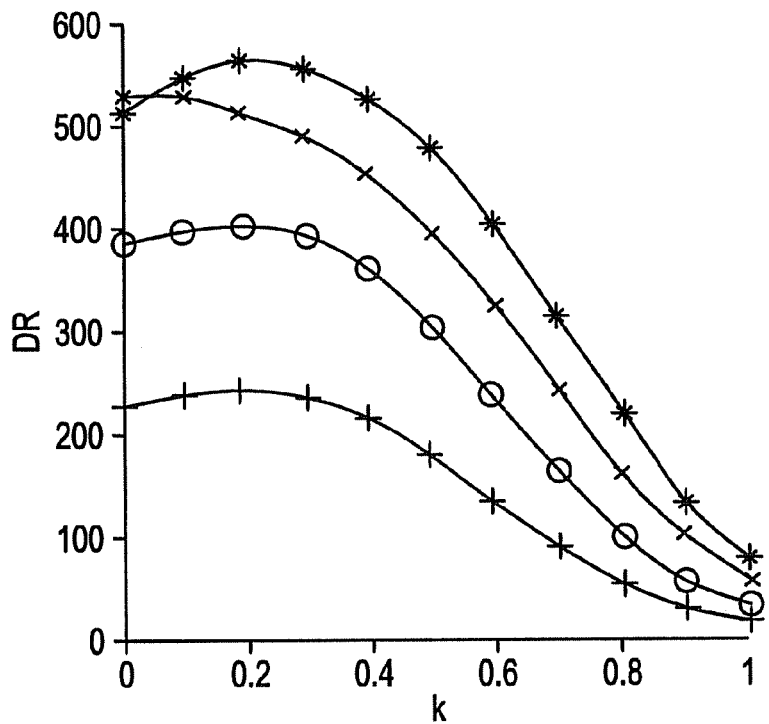
FIG. 6A is the simulation results of the average of the discrimination ratio(DR) between an authorized card and an unauthorized card with an unauthorized fingerprint in the presence of additive colored noise with a bandwidth of 15 versus the index nonlinearity k. The results correspond to additive colored noise on the reference image with a standard deviation of 0.7 and different input additive colored noise levels. The curves designated by an asterisk (*) correspond to the performance of the system in the absence of input noise.
Figure 6B:
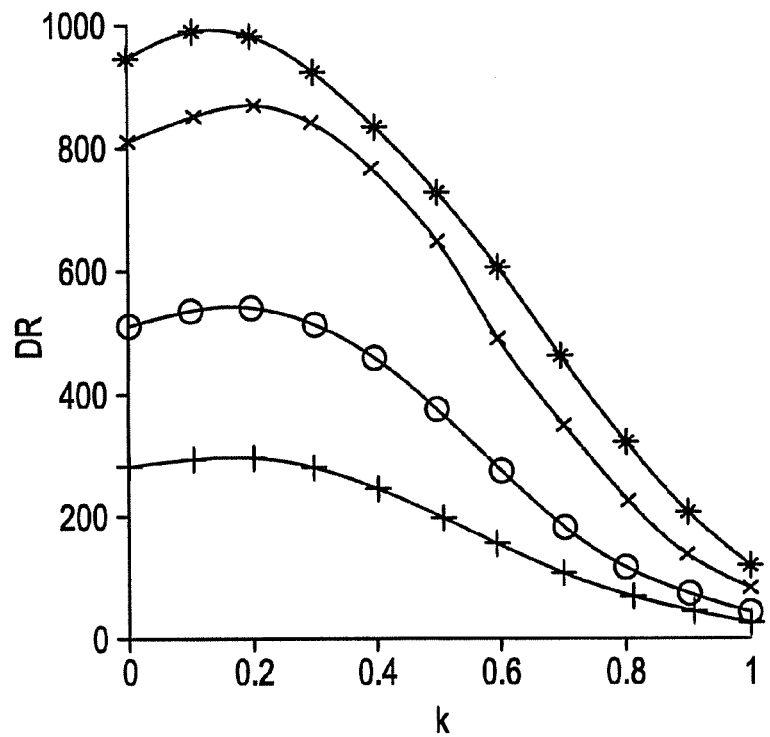
FIG. 6B is the simulation results of the average of the discrimination ratio (DR) between an authorized card and an unauthorized card with an unauthorized code in the presence of additive colored noise with a bandwidth of 15 versus the index nonlinearity k. The results correspond to additive colored noise on the reference image with a standard deviation of 0.7 and different input additive noise levels. The curves designated by an asterisk (*) correspond to the performance of the system in the absence of input noise.
Figure 6C:
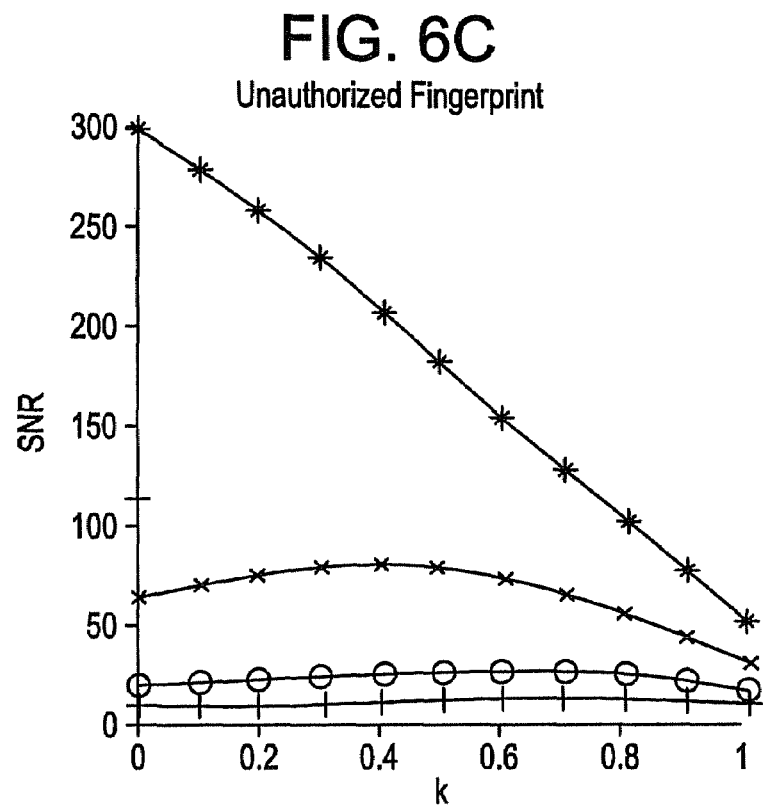
FIG. 6C is the simulation results of the output Signal-To-Noise ratio (SNR) in the presence of additive colored noise with a bandwidth of 15 versus the index nonlinearity k. The results correspond to additive colored noise on the reference image with a standard deviation of 0.7 and different input additive noise levels. The curves designated by an asterisk (*) correspond to the performance of the system in the absence of input noise.
Figure 6D:
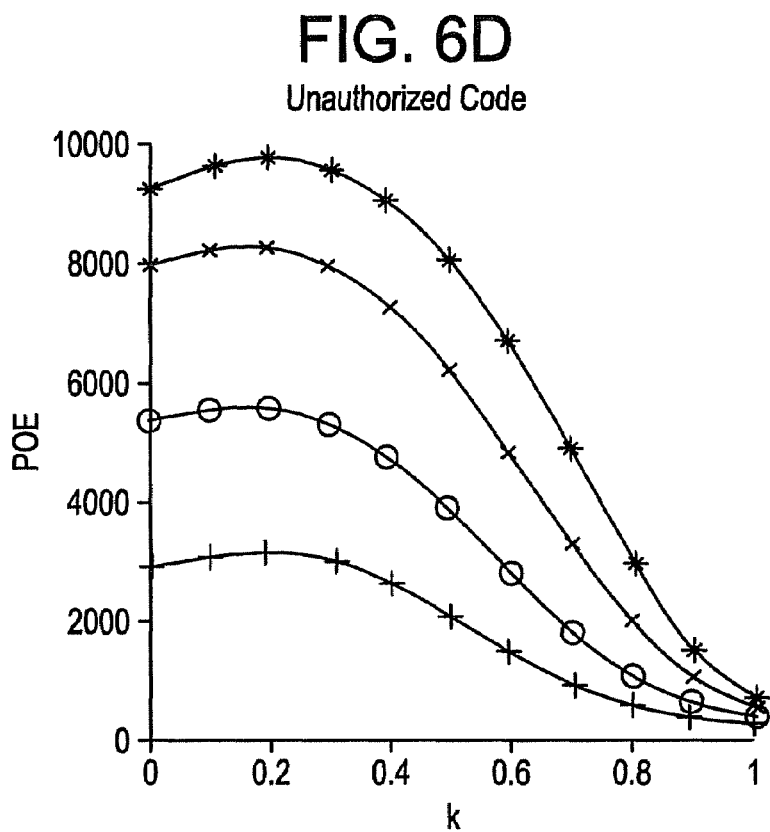
FIG. 6D is the simulation results of the output Peak-to-Output Energy ratio (POE) in the presence of additive colored noise with a bandwidth of 15 versus the index nonlinearity k. The results correspond to additive colored noise on the reference image with a standard deviation of 0.7 and different input additive noise levels. The curves designated by an asterisk (*) correspond to the performance of the system in the absence of input noise.

FIGS. 6A through 6D illustrate the performance of the processor versus the nonlinearity index k in presence of the additive colored noise, in terms of DR, SNR and POE, respectively. FIGS. 6A and 6B correspond to the false-class inputs with an unauthorized fingerprint and an unauthorized code, respectively.

Figure 7:
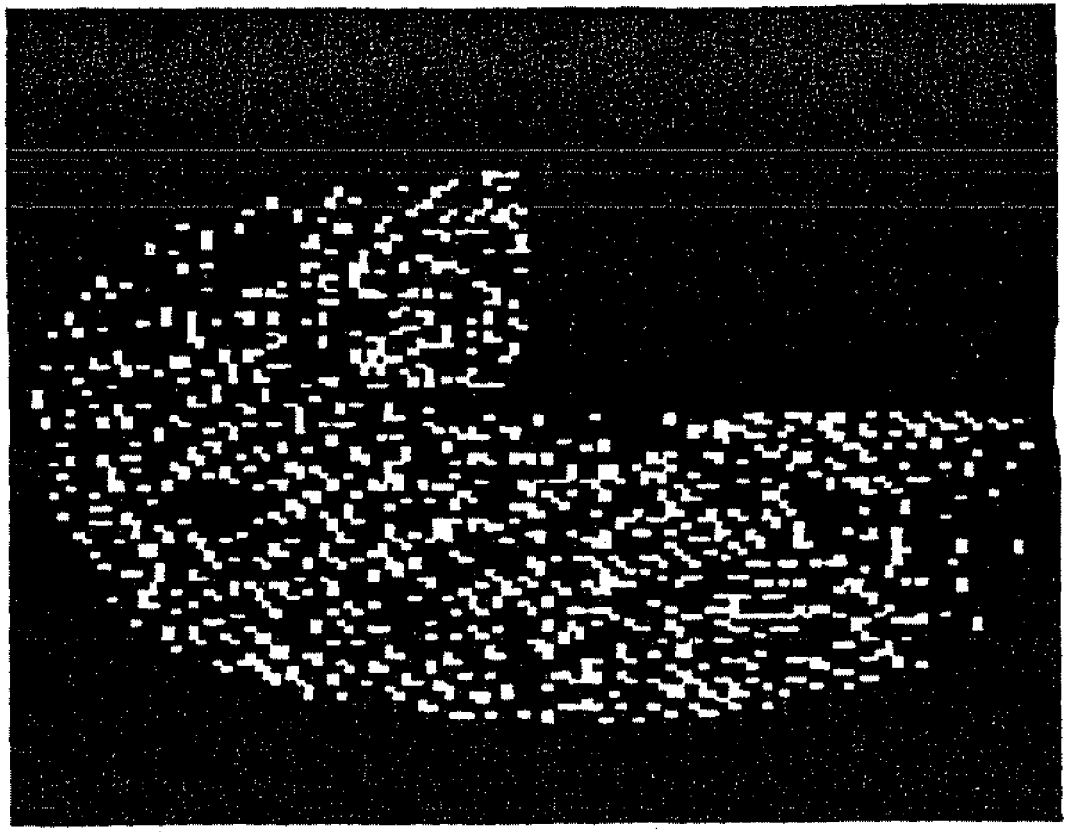
FIG. 7 is the input primary pattern with missing data when 25% of the authorized fingerprint is blocked.
Figure 8A:
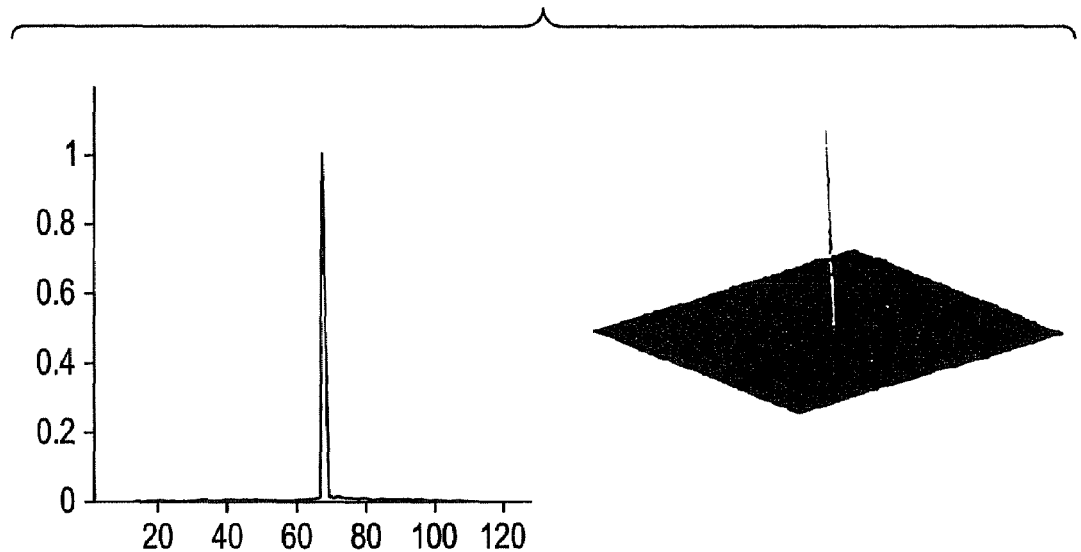
FIG. 8A is the correlation results of the output correlation intensity for an authentic card with nonlinearity index k=0.3 and 25% of the authorized fingerprint data missing.
Figure 8B:
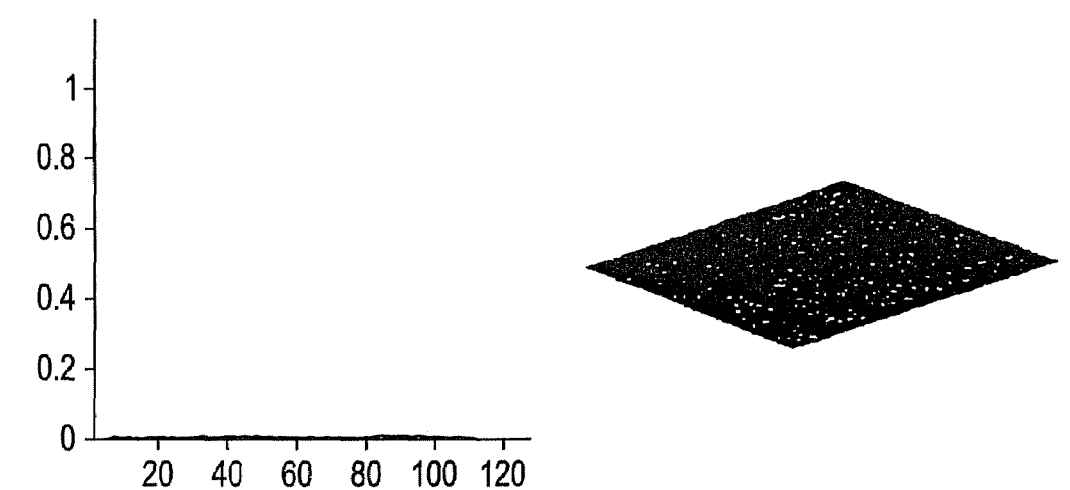
FIG. 8B is the correlation results of the output correlation intensity for an authorized input with an unauthorized code with nonlinearity index k=0.3 and 25% of the authorized fingerprint data missing.
Figure 8C:
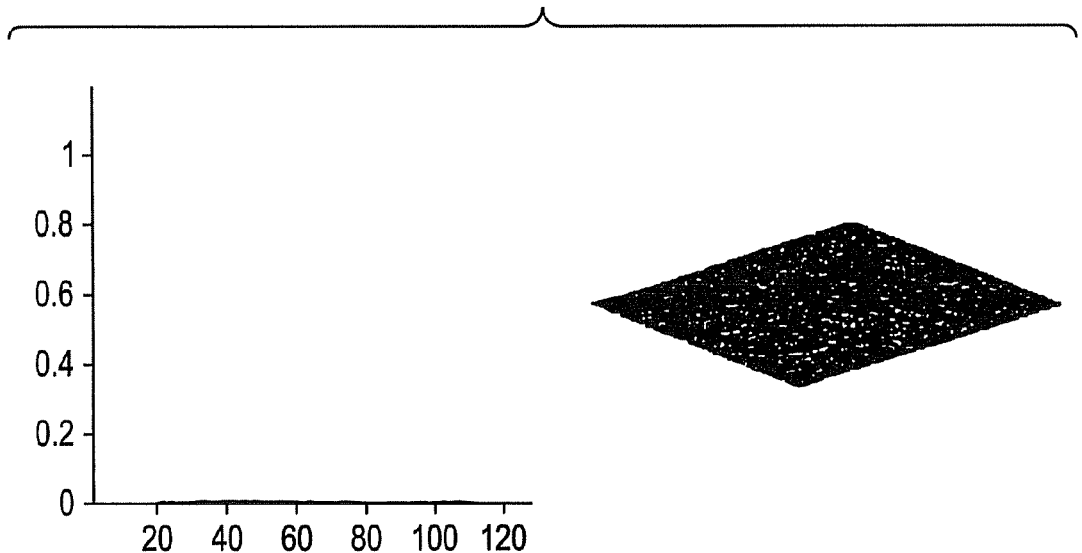
FIG. 8C is the correlation results of the output correlation intensity for an unauthorized input with an authorized code with nonlinearity index k=0.3 and 25% of the authorized fingerprint data missing.
Figure 8D:
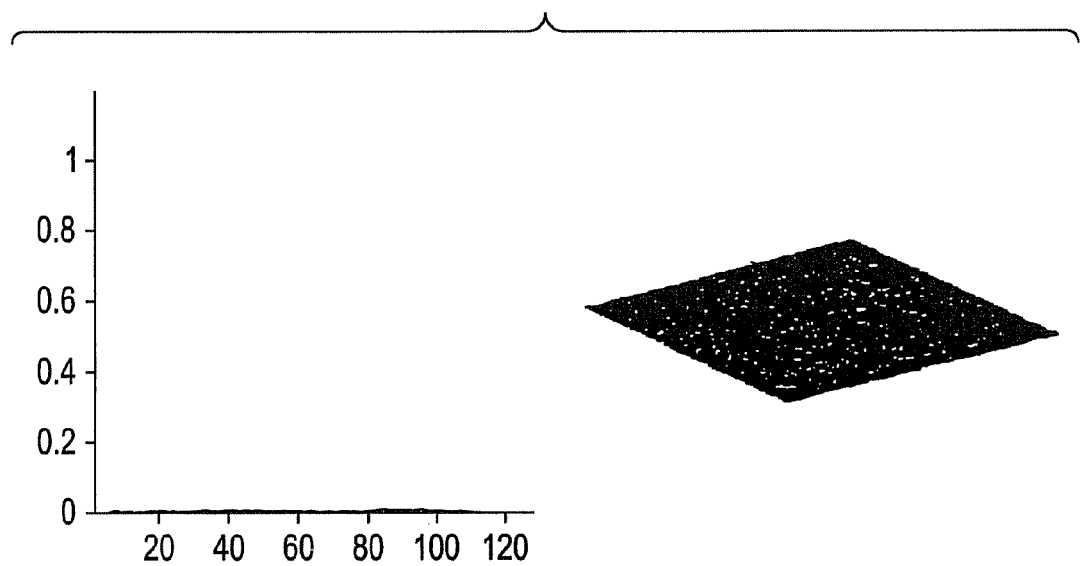
FIG. 8D is the correlation results of the output correlation intensity for an unauthorized input with an unauthorized code with nonlinearity index k=0.3 and 25% of the authorized fingerprint data missing.

The robustness to missing data during the acquisition of the primary pattern information is tested. FIG. 7 shows an example of input primary pattern with missing data when 25% of the authorized fingerprint is blocked. The results of the tests with missing input data are presented in FIGS. 8A-D. In the simulation presented here, additive white noise is used for both the input primary pattern (with a standard deviation equal to 0.3) and for the reference encoded on the credit card (with a standard deviation equal to 0.7).

System performance using rotation-invariant encoded references is disclosed. In real applications of the system, rotation of the primary pattern during acquisition of the fingerprint may occur. Some simulations of in-plane rotation indicate that, the system proposed in this invention can tolerate one degree of input image rotation. The sensitivity depends on the nonlinearity index k. The smaller the nonlinearity index k, the more sensitive the system is to rotation changes in input primary pattern. The range of the rotation of the primary pattern during the acquisition process may be very limited, and it can be reduced by the system, using a guide for the user's finger: thus a controlled environment may be used.

To improve the rotation robustness of the system, a rotation invariant primary pattern using a training set of rotated images is developed. The rotation invariant primary pattern is encoded on the card. This rotation invariant primary pattern is a linear combination of several images of a single fingerprint. Each image is rotated by a small angle.

Figure 9A:
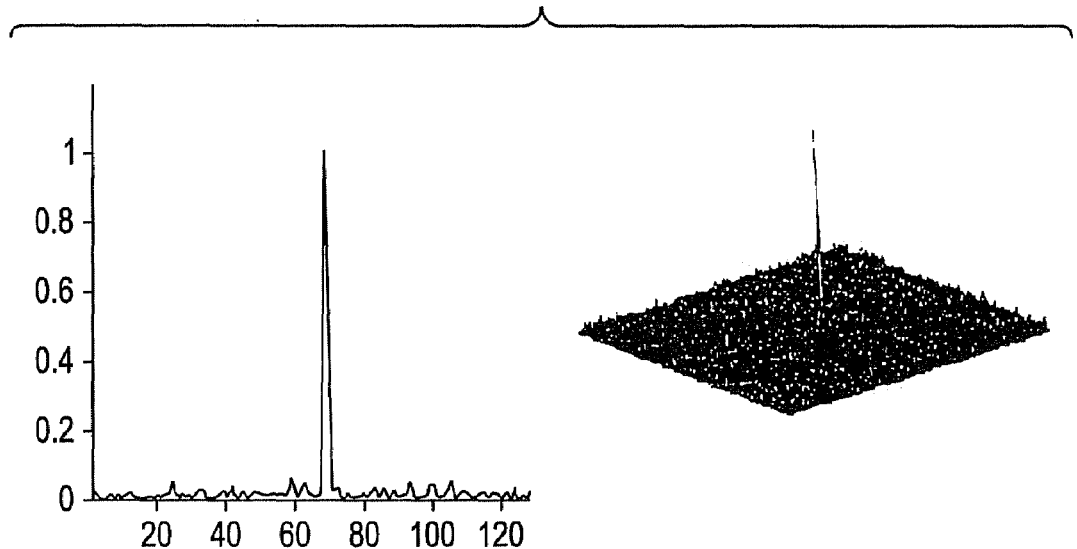
FIG. 9A shows the correlation results for discrimination between an authorized and an unauthorized input using the rotation-invariant reference image encoded on the card for an authorized input.
Figure 9B:
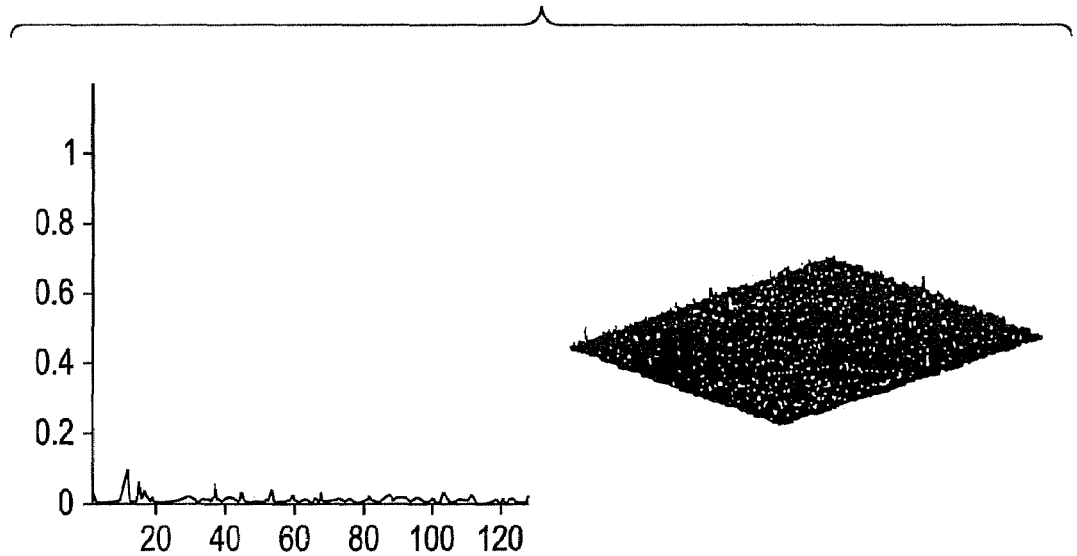
FIG. 9B shows the correlation results for discrimination between an authorized and an unauthorized input using the rotation-invariant reference image encoded on the card for an unauthorized input with an unauthorized fingerprint.
Figure 9C:
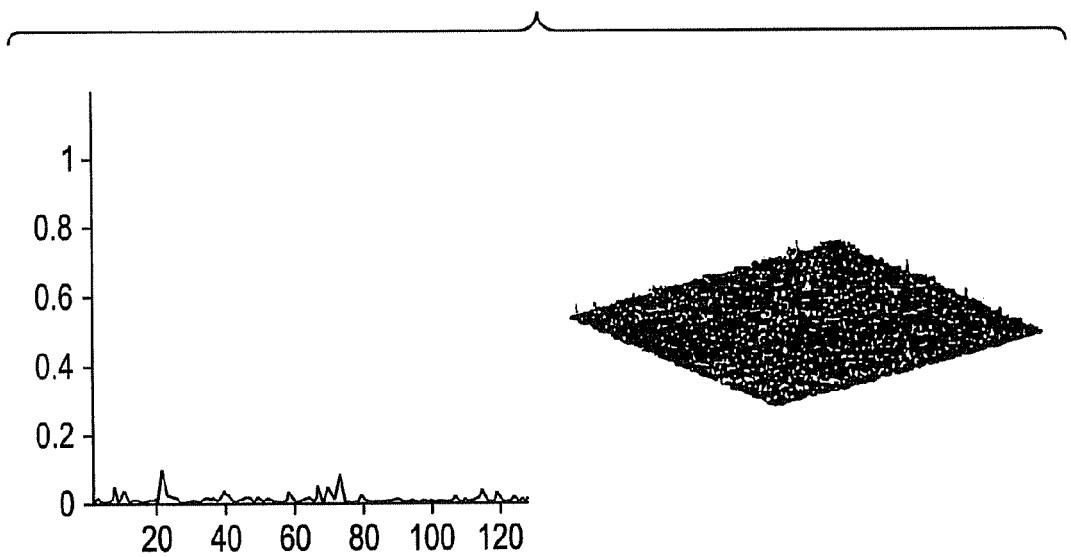
FIG. 9C shows the correlation results for discrimination between an authorized and an unauthorized input using the rotation-invariant reference image encoded on the card for an unauthorized input with an unauthorized code.
Figure 9D:
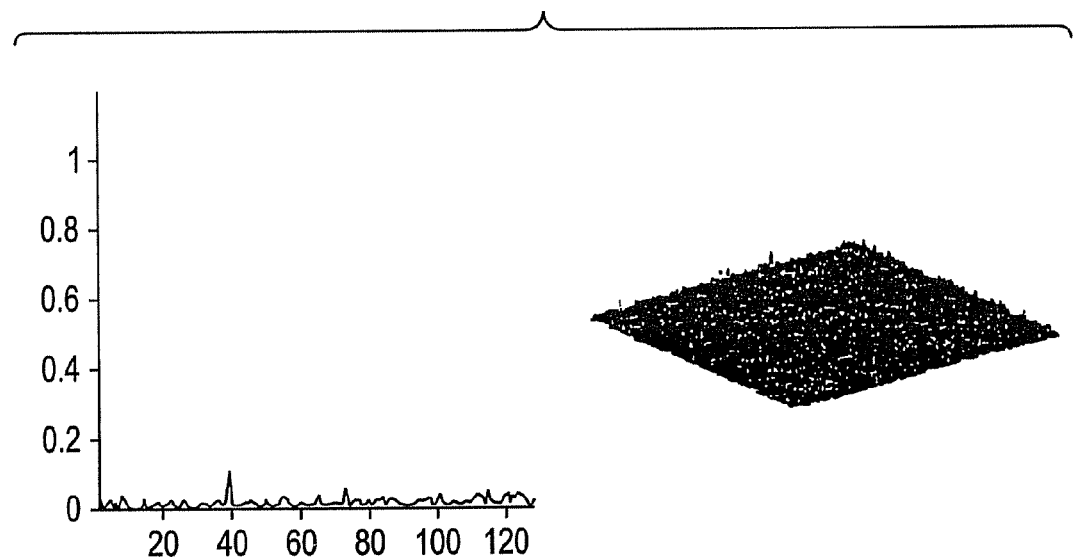
FIG. 9D shows the correlation results for discrimination between an authorized and an unauthorized input using the rotation-invariant reference image encoded on the card for an unauthorized input with an unauthorized fingerprint and an unauthorized code.

The rotation-invariant pattern encoded on the card is given by the following equation, $$\overline{p}(x, y) = \frac{\left\{\sum_a \exp[i\pi f_a(x, y)/\text{Max}(f_a(x, y))]\right\} \otimes c(x, y)}{\left|\left\{\sum_a \exp[i\pi f_a(x, y)/\text{Max}(f_a(x, y))]\right\} \otimes c(x, y)\right|} \quad (14)$$

where $f_a(x,y)$ is the primary pattern rotated by an angle $\alpha$. In the experiment presented here the sum is over $-10$ to $+10$ degrees in increments of 1 degree, and the rotation axis coincides with the center of the image. The correlation results correspond to nonlinear JTC for k=0.3. FIG. 9A is the output correlation intensity for the authentic input card, using a rotation-invariant reference image encoded on the card. Here the correct fingerprint is rotated by 7 degrees and the authorized code is used. A sharp and strong output peak is obtained, FIGS. 9B, 9C and 9D show the output correlation intensity for false inputs, where no correlation peak appears. In the simulation presented here, additive white noise is taken into account for both the input primary pattern (with a standard deviation equal to 0.3) and for the reference encoded on the card (with a standard deviation equal to 0.7). In the experiments, the correlation output is normalized by the maximum correlation peak obtained by the authentic card. FIG. 9B shows the correlation output for an authorized random code and an unauthorized fingerprint. FIG. 9C shows the output correlation for an authorized fingerprint and an unauthorized random code. FIG. 9D shows the output correlation plane for an unauthorized fingerprint and an unauthorized code. The tests illustrate that the rotation invariant reference image provides tolerances to rotation of input primary images.

Figure 10:
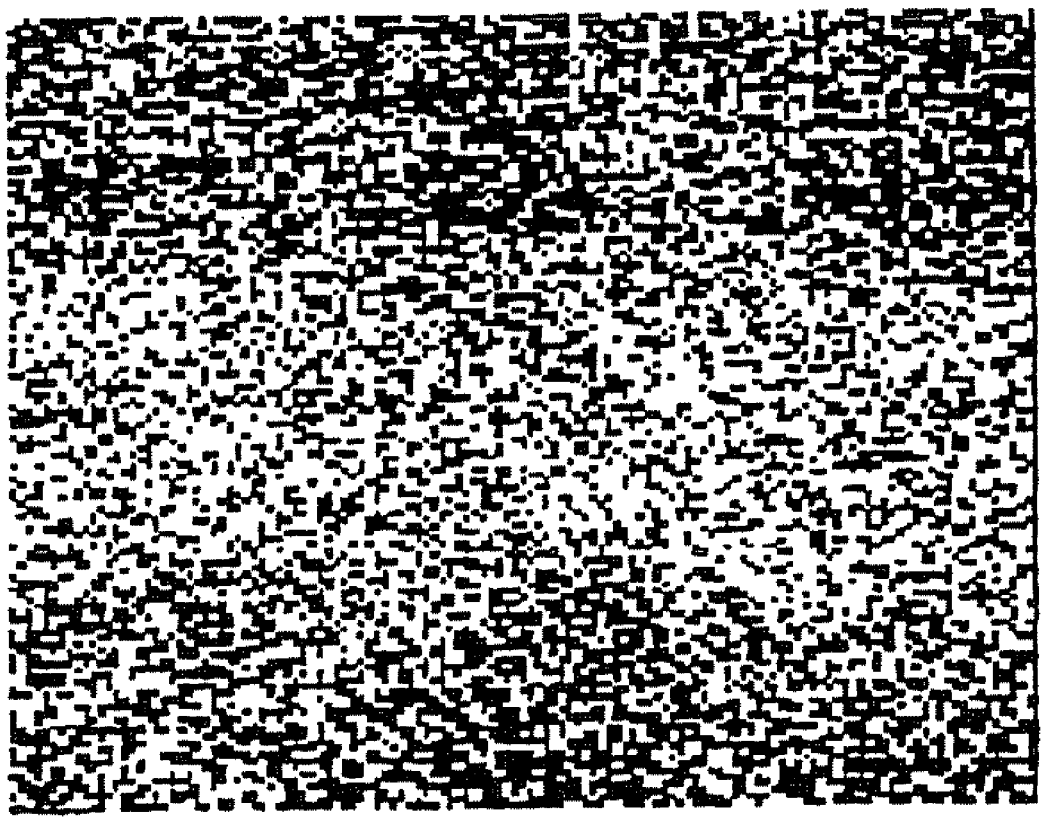
FIG. 10 is the binary phase information encoded at the input.

The system performance when the phase information encoded on the card is binarized is disclosed. Display of the complex spatial distribution on the card may not be trivial. To remedy this problem, the binarization of the distribution which is to be encoded on the card is tested. The reference image encoded on the card at each point is set equal to 1 when the real part of the reference image is positive and equal to $-1$ otherwise as seen in Eq. 3. This approach leads to a 2-D binary pattern placed on the card. It is shown that in the simulation, the verification and the validation are obtained with high accuracy. FIG. 10 illustrates the binary phase distribution encoded on the card obtained by using Eq. 3.

Figure 11A:
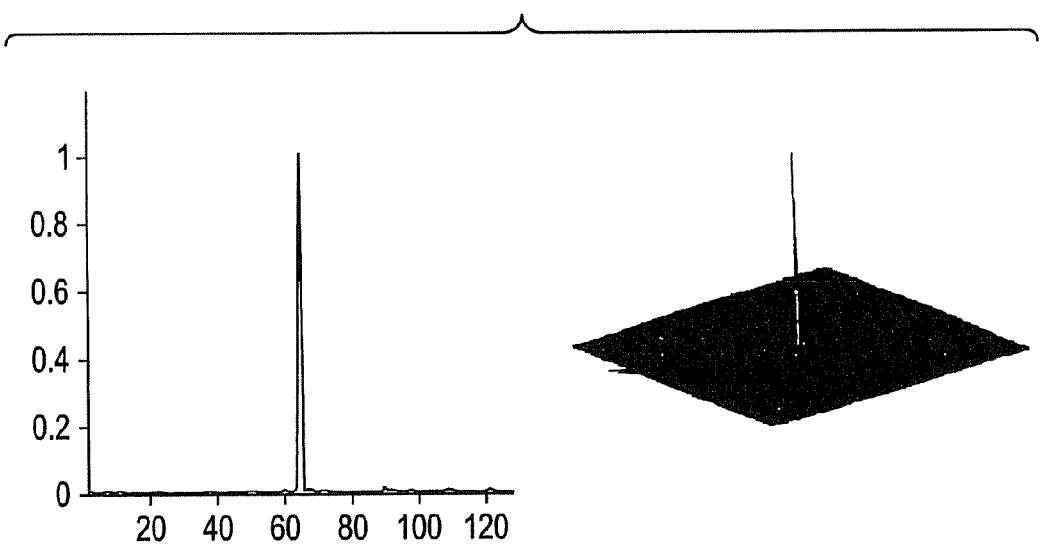
FIG. 11A is the correlation results for discrimination between the authorized and unauthorized cards using the binarization of the reference encoded at the input for an authorized input.
Figure 11B:
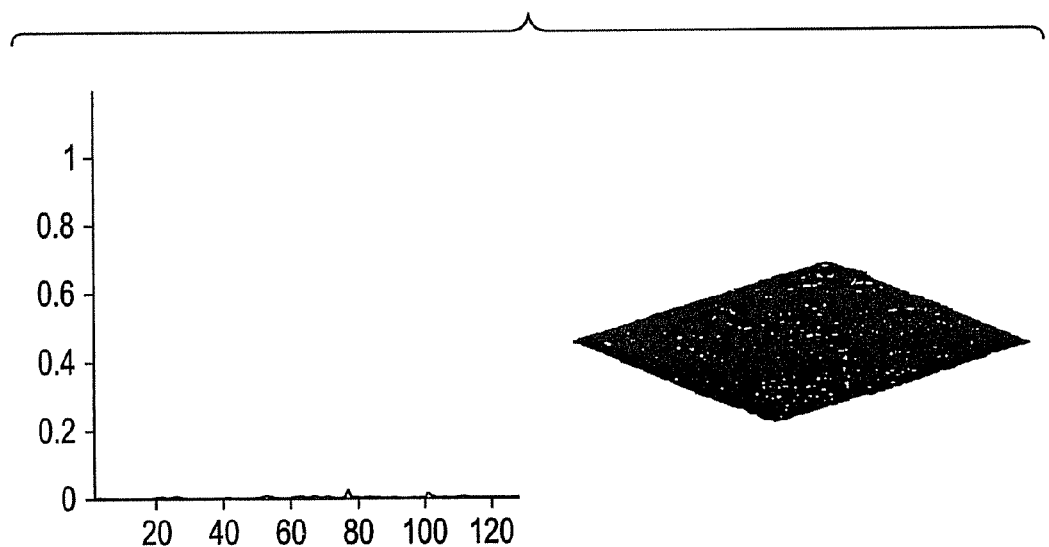
FIG. 11B is the correlation results for discrimination between the authorized and unauthorized cards using the binarization of the reference encoded at the input for an unauthorized input with an unauthorized fingerprint.
Figure 11C:
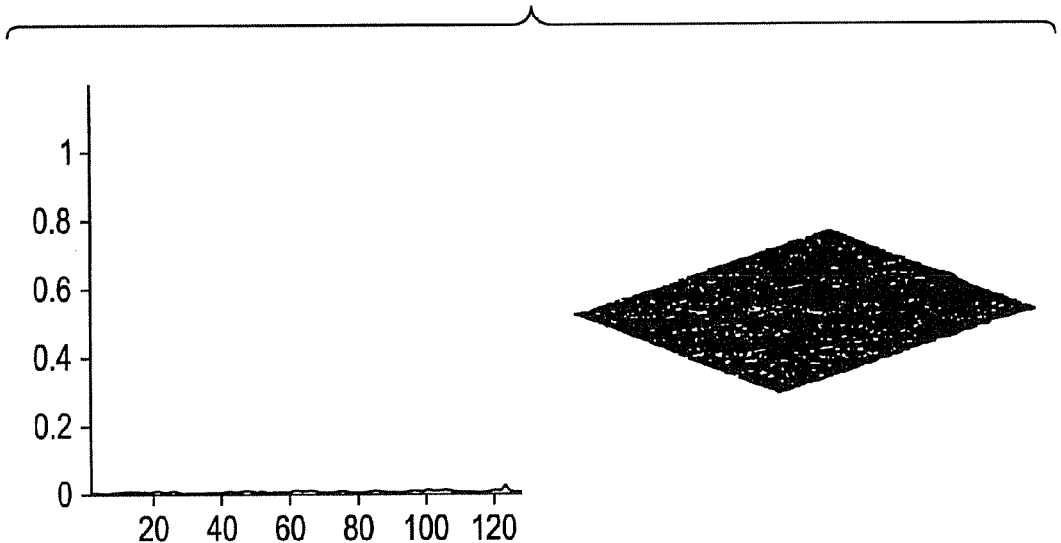
FIG. 11C is the correlation results for discrimination between the authorized and unauthorized cards using the binarization of the reference encoded at the input for an unauthorized input with an unauthorized code.
Figure 11D:
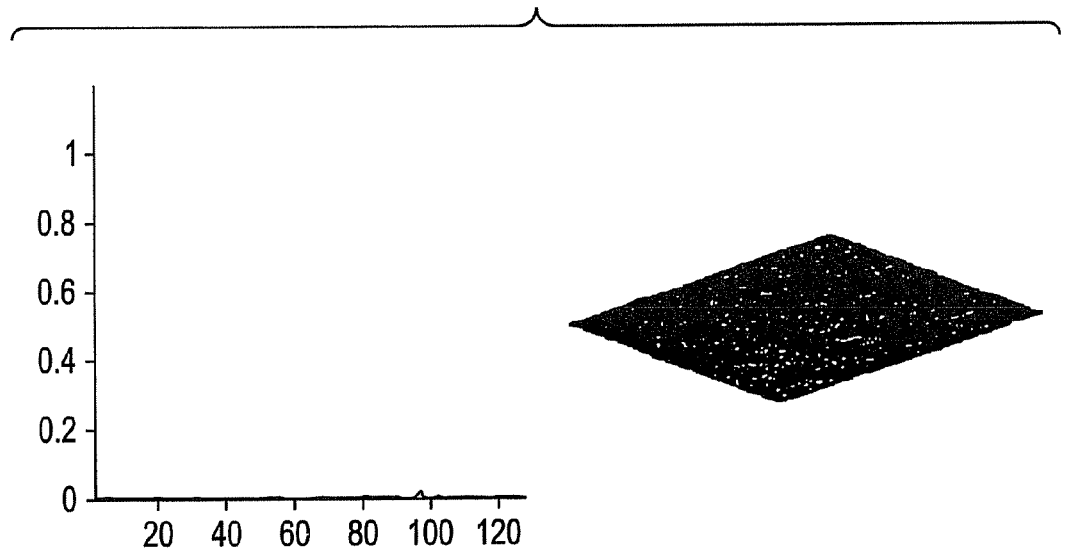
FIG. 11D the correlation results for discrimination between the authorized and unauthorized cards using the binarization of the reference encoded at the input for an unauthorized input with an unauthorized fingerprint and an unauthorized code.

FIG. 11A is the output correlation intensity for the authentic card. FIGS. 11B, 11C and 11D show the output correlation intensity for an unauthorized card for which no correlation peak appears. FIG. 11B shows the correlation output for an authorized random code and an unauthorized fingerprint. FIG. 11C shows the output correlation for an authorized fingerprint and an unauthorized random code. FIG. 11D shows the output correlation plane for an unauthorized fingerprint and an unauthorized code. Binarization of the information on the card in the proposed system can provide good discrimination ratio for verification and validation.

Figure 12A:
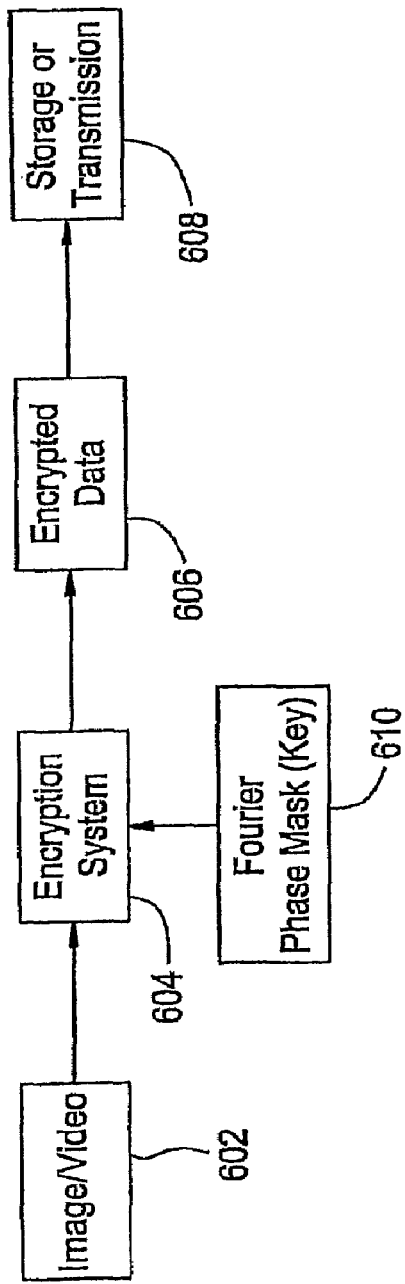
FIG. 12A shows the transmitter-encoder of a secure image/video-storage/transmission system that uses a combination of double-random phase encryption and a digital holographic technique.
Figure 12B:
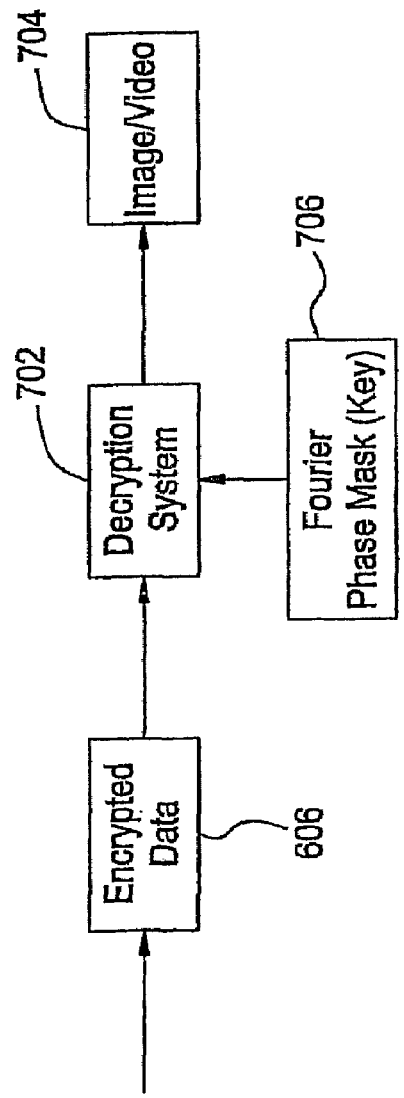
FIG. 12B shows the receiver-decoder of a secure image/video-storage/transmission system that uses a combination of double-random phase encryption and a digital holographic technique.

FIGS. 12A and 12B show a secure image/video-storage/transmission system based upon the proposed holographic system. The image/video data 602 are encrypted optically 604 to provide encrypted data 606 by the double-random phase encryption technique and recorded as a digital hologram 608. The optical key 610, that is, the Fourier phase mask, can also be recorded as a digital hologram. The encrypted data 606 can be decrypted digitally (system 702) with the hologram of the optical key 706 to provide image/video 704.

Figure 13:
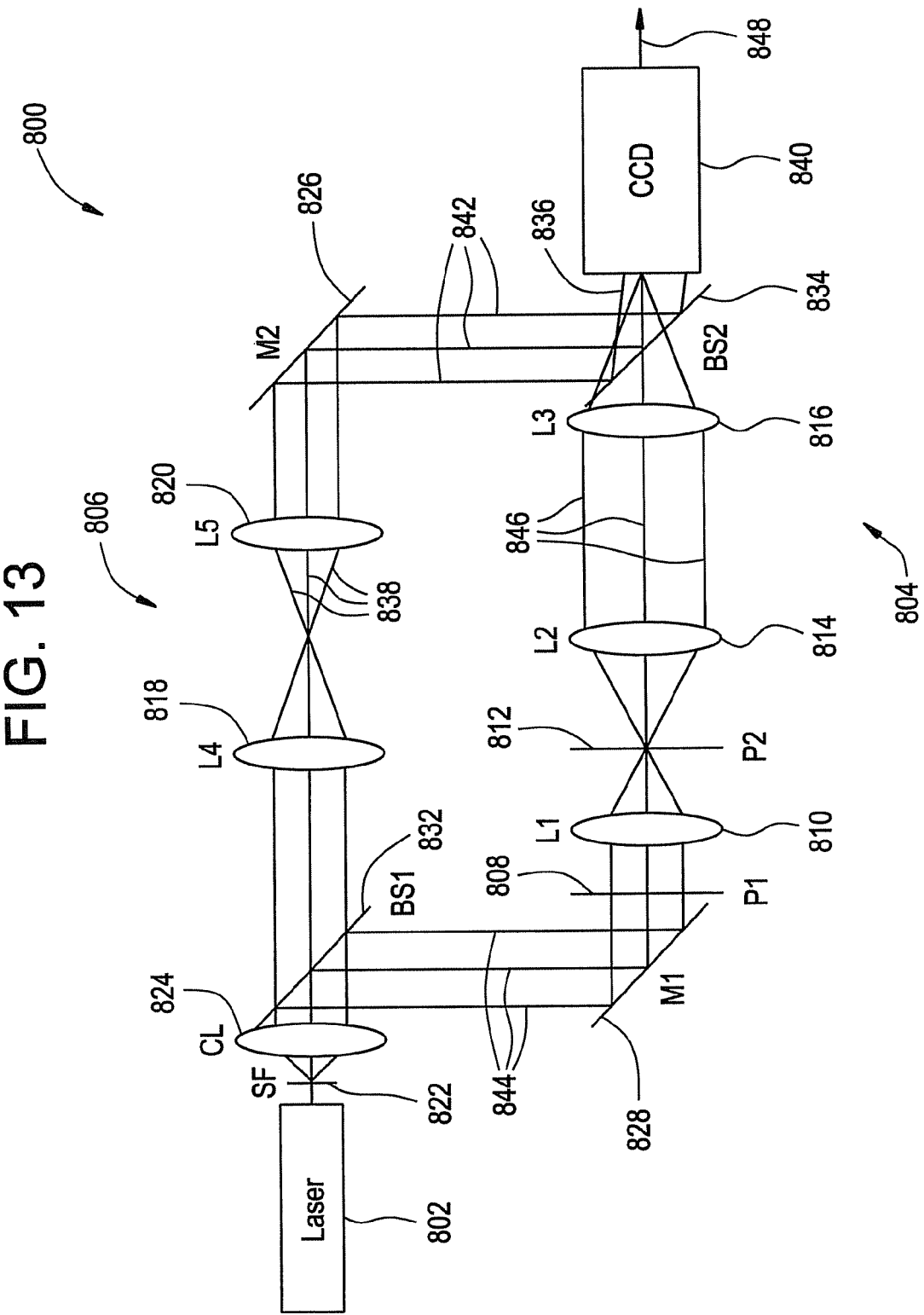
FIG. 13 shows an optical arrangement in the nature of a Mach-Zehnder interferometer.

Referring to FIG. 13, a Mach-Zehnder interferometer is shown generally at 800. A Helium-Neon laser 802 with a Spatial Filter (SF) 822 is a source of coherent light 844 which is collimated by collimating lens (CL) 824, split by beam splitter (BS1) 832, and directed by mirror (M1) 828 to the arms. The lower arm 804 of the interferometer 800 is the optical path of the image encryption. The upper arm 806 is the reference wave. The input image to be encrypted is bonded with the input phase mask at plane $P_1$ (808). This product is transformed by lens $L_1$ (810). Such transformation may be for example a Fourier transformation or a Fresnel transformation. The transformation is multiplied by the Fourier phase mask at plane $P_2$ (812) and imaged onto the CCD camera by the 4-f optical system of lenses $L_2$ (814) and $L_3$ (816). The reference wave 838 passes through the 4-f optical system of lenses $L_4$ (818) and $L_5$ (820) to maintain the spatial coherence.

At the CCD camera 840, a hologram is created by the interference between the encrypted data and the slightly inclined reference plane wave 842 directed by mirror (M2) 826 and beam combiner (BS2) 834. The hologram 836 captured by the CCD 840 camera is sampled with 512×480 pixels and is quantized to 8 bits of gray levels by a frame-grabber board (not shown) to provide signal 848. The input image, the input phase mask, and the lens $L_1$ (810) are removed when we record the hologram of the Fourier phase mask. In the experiments, a random phase mask is used with a correlation length of less than 10 Φm as an input phase mask and a lens as the Fourier phase mask.

The reason why a lens is used is the lack of sufficient space-bandwidth product of both the optical system 800 and CCD camera 840 to permit use of a wide-angle random phase mask with a small correlation length of less than 10 Φm. To remedy this problem, phase masks can be designed to take into account the available space-bandwidth product of the optical system. Lens $L_1$ (810) has a numerical aperture of 0.10, lenses $L_2$ (814) and $L_3$ (816) each have a numerical aperture of 0.14, and lenses $L_4$ (818) and $L_5$ (820) each have a numerical aperture of 0.17. The CCD array 840 has dimensions 6.4×4.8 mm.

Figure 14:
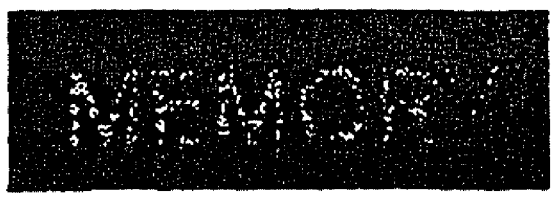
FIG. 14 shows the digital input images.
Figure 14:
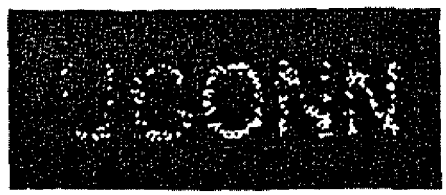

FIG. 14 shows the input images to be decrypted. These electronically reconstructed images are obtained with an input phase mask without the Fourier phase mask. Scattering that is due to the thickness of the input random phase mask and the limitation on the numerical aperture of the lens $L_1$ (810) are the reasons why the images are somewhat noisy.

Figure 15A:
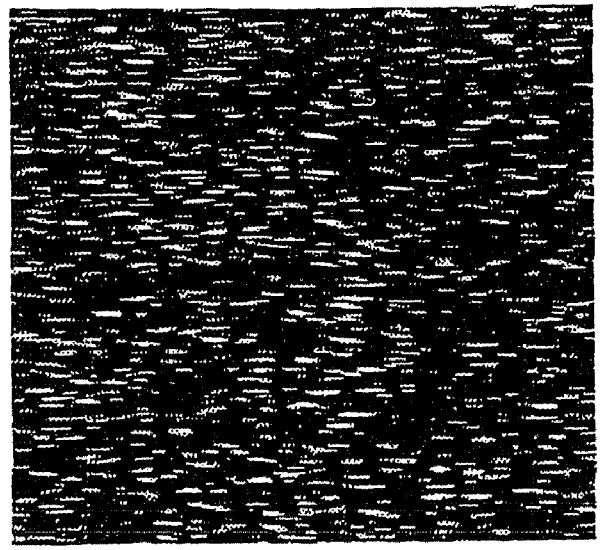
FIG. 15A shows a digital hologram of the encrypted data.
Figure 15B:
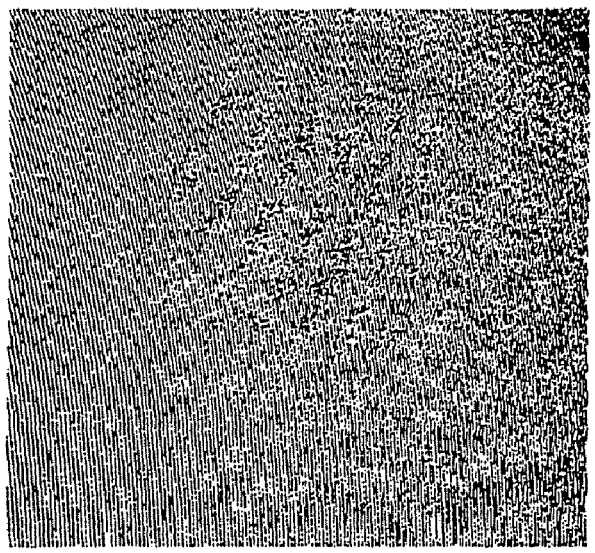
FIG. 15B shows a digital hologram of the Fourier phase mask.
Figure 16:
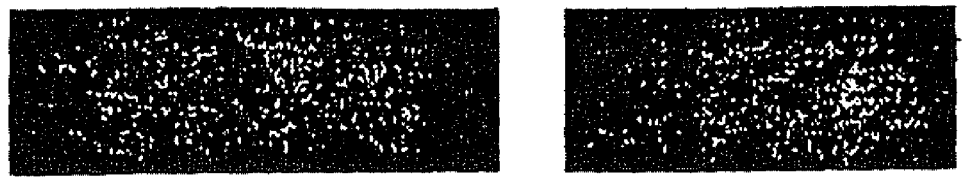
FIG. 16 shows the digitally reconstructed encrypted images by inverse Fourier transforming the encrypted data in FIG. 15A.
Figure 17:
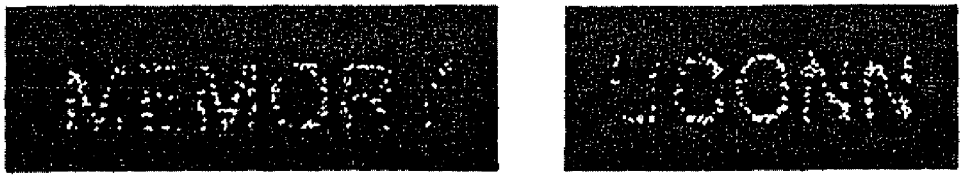
FIG. 17 shows the digitally reconstructed images that have been decrypted by inverse Fourier transforming the hologram of the encrypted data of FIG. 15A with hologram of the Fourier phase mask of FIG. 15B.

Digital holograms of the encrypted data and the Fourier phase mask are shown in FIGS. 15A and 15B respectively. The digitally reconstructed encrypted images are shown in FIG. 16. These images were obtained by inverse Fourier transforming of the digital hologram of the encrypted data. The original images cannot be recognized. The mean-square errors between the original images AMEMORY@ and AUCONN@ of FIG. 14 and the encrypted images of FIGS. 15A and 15B are 7.3 and 6.6, respectively. The digitally reconstructed images that have been decrypted with the hologram of the Fourier phase mask are shown in FIG. 17. The original images can be seen. The mean-square errors between the original images AMEMORY@ and AUCONN@ of FIG. 14 and the decrypted images of FIG. 17 are 0.97 and 1.1, respectively. The experimental results demonstrate the feasibility of the proposed method.

Thus, a new method and system for security verification of objects such as a credit card or an ID card, using optical pattern recognition has been shown. This method is based on phase encoded convolution of the primary pattern with a random code placed on the card. An optical system to perform the verification has been described. The correlation is performed using a nonlinear joint transform correlator (JTC). For the images presented here, the proposed method can identify an authorized input by producing well defined output peaks, and it rejects the unauthorized input with a high discrimination ratio. The performance of the system in terms of input noise, biometric rotation, and missing data has been investigated. For the tests provided here, the proposed system is found to be robust to noise added to the input primary pattern and to the reference pattern encoded on the card. Nonlinear correlation allows a compromise between the noise tolerance and the discrimination ratio. The tests using missing data show that, for the fingerprint image used in the simulation, the system provides good tolerance up to 25% of missing data in the input primary pattern and that the security verification of the authorized input is highly discriminate against the unauthorized inputs. A rotation invariant composite reference primary pattern is designed to provide tolerance to rotation of the input primary image. Binarization of the phase information encoded on the card has been tested. The results indicate that the verification is obtained with high discrimination ratio of authorized inputs against unauthorized inputs.

An image security method and system that uses digital holography has also been presented. This method allows the encrypted data to be stored, transmitted, and decrypted digitally. Optical experiments have been shown to illustrate the proposed method. The system can be used for secure video storage and transmission.

What is claimed is:

1. A system comprising:
    a beam splitter disposed within a path of a signal source for dividing output from the signal source into a first signal following a first signal path and a second signal following a second signal path, the first signal path being a path for a reference signal and the second signal path being a path of image encryption;
    a first subsystem to receive the first signal from the signal source and to provide as output therefrom a first output signal;
    a second subsystem to receive the second signal from the signal source and providing as output therefrom a second output signal; and
    a third subsystem to combine the first and second output signals;
    the second subsystem comprising:
        an input phase mask disposed within the second signal path;
        a first transforming lens disposed within the second signal path after the input phase mask;
        a Fourier phase mask disposed within the second signal path after the first transforming lens;
        a second transforming lens disposed within the second signal path after the Fourier phase mask; and
        a third transforming lens disposed within the second signal path after the second transforming lens and before the third subsystem.

2. The system as set forth in claim 1 wherein the signal source comprises an optical source.

3. The system as set forth in claim 2 wherein the optical source comprises a coherent source.

4. The system as set forth in claim 3 wherein the first subsystem comprises:
    a fourth transforming lens disposed within the first signal path; and
    a fifth transforming lens disposed within the first signal path.

5. The system as set forth in claim 3 wherein the third subsystem comprises:
    a beam combiner for combining the first output signal and the second output signal.

6. The system as set forth in claim 3 further comprising:
    a fourth subsystem to acquire a set of encrypted data;
    wherein the fourth subsystem comprises a recording apparatus for recording the combination of the first and second signals.

* * * * *